US012209437B2

(12) United States Patent
Askin et al.

(10) Patent No.: US 12,209,437 B2
(45) Date of Patent: Jan. 28, 2025

(54) DOCKING STATION FOR MICROMOBILITY TRANSIT VEHICLES

(71) Applicant: Lyft, Inc., San Francisco, CA (US)

(72) Inventors: Erik Keith Askin, San Francisco, CA (US); Jordan Elias Brooks, San Francisco, CA (US); Jason Robert Cerundolo, Oakland, CA (US); Alexander Timothy Dixon, San Anselmo, CA (US); Eahab Nagi El Naga, San Francisco, CA (US); Marc Daniel Fenigstein, San Francisco, CA (US); Michael Jeffrey Holachek, Emeryville, CA (US)

(73) Assignee: Lyft, Inc., San Francisco, CA (US)

( * ) Notice: Subject to any disclaimer, the term of this patent is extended or adjusted under 35 U.S.C. 154(b) by 901 days.

(21) Appl. No.: 17/119,411

(22) Filed: Dec. 11, 2020

(65) Prior Publication Data
US 2022/0185408 A1    Jun. 16, 2022

(51) Int. Cl.
*B62H 5/00*    (2006.01)
*B62H 3/00*    (2006.01)
(Continued)

(52) U.S. Cl.
CPC .............. *E05B 71/00* (2013.01); *B62H 3/00* (2013.01); *B62H 5/003* (2013.01); *B62H 5/20* (2013.01);
(Continued)

(58) Field of Classification Search
CPC .... E05B 67/003; E05B 71/00; E05B 73/0005; E05B 2045/065; E05B 2045/0665; E05B 2045/08; E05B 2045/12; E05B 2047/0082; B62H 3/00; B62H 5/00; B62H 5/003; B62H 5/20
See application file for complete search history.

(56) References Cited

U.S. PATENT DOCUMENTS 3,802,178 A    4/1974   Tsuruishi
4,785,435 A    11/1988  Inoue et al.
(Continued)

FOREIGN PATENT DOCUMENTS

CA    2039503 A1    10/1992
CA    2116961 A1    3/1993
(Continued)

OTHER PUBLICATIONS

International Search Report and Written Opinion for International Application No. PCT/US2021/062550, 11 pages, Apr. 5, 2022.
(Continued)

*Primary Examiner* — Christopher J Boswell
(74) *Attorney, Agent, or Firm* — Baker Botts L.L.P.

(57) ABSTRACT

A docking station for micromobility transit vehicles is provided. The docking station may include a rack configured to dock a micromobility transit vehicle, a bollard for securing the micromobility transit vehicle within the rack, and a dock module configured to detect a characteristic of a lock cable securing the micromobility transit vehicle to the bollard. The dock module may include an inductive coil assembly disposed around a hole of the bollard to detect the lock cable inserted into the hole.

20 Claims, 20 Drawing Sheets

(51) Int. Cl.
  *B62H 5/20* (2006.01)
  *E05B 45/08* (2006.01)
  *E05B 47/00* (2006.01)
  *E05B 71/00* (2006.01)
  *E05B 45/06* (2006.01)
  *H04W 4/40* (2018.01)

(52) U.S. Cl.
  CPC ........ *E05B 45/08* (2013.01); *E05B 2045/065* (2013.01); *E05B 2047/0082* (2013.01); *H04W 4/40* (2018.02)

(56) References Cited

U.S. PATENT DOCUMENTS

| | | | | |
|---|---|---|---|---|
| 4,920,334 | A | * | 4/1990 | DeVolpi .......... B62H 5/003 340/568.4 |
| 5,917,407 | A | * | 6/1999 | Squire .............. B62H 5/00 235/382 |
| 6,309,098 | B1 | | 10/2001 | Wong |
| 6,384,717 | B1 | | 5/2002 | DeVolpi |
| 6,505,774 | B1 | | 1/2003 | Fulcher et al. |
| 6,715,673 | B2 | | 4/2004 | Fulcher et al. |
| 6,888,472 | B2 | | 5/2005 | Yoshimura et al. |
| 7,014,355 | B2 | | 3/2006 | Potter et al. |
| 7,027,358 | B1 | | 4/2006 | Esposito et al. |
| 7,230,545 | B2 | | 6/2007 | Nath et al. |
| 7,898,439 | B2 | | 3/2011 | Bettez et al. |
| 8,065,895 | B2 | * | 11/2011 | Andersen ............. B62H 5/003 340/427 |
| 9,013,301 | B2 | * | 4/2015 | Williams ............ B62H 5/003 340/568.1 |
| 9,068,374 | B2 | * | 6/2015 | Jayadevappa ........ B62H 3/00 |
| 9,076,136 | B2 | | 7/2015 | Bettez et al. |
| 10,472,011 | B2 | * | 11/2019 | Wu .................... B62H 5/06 |
| 11,214,322 | B2 | * | 1/2022 | Askin ............... B62H 5/003 |
| 2002/0008624 | A1 | | 1/2002 | Paek |
| 2003/0090363 | A1 | | 5/2003 | Ogura et al. |
| 2003/0102975 | A1 | | 6/2003 | Hache |
| 2004/0122688 | A1 | | 6/2004 | Janda |
| 2006/0212344 | A1 | | 9/2006 | Marcus et al. |
| 2007/0220933 | A1 | | 9/2007 | Gagosz |
| 2007/0239465 | A1 | | 10/2007 | Le Gars |
| 2008/0297108 | A1 | * | 12/2008 | Le Gars ............... B62H 3/00 320/109 |
| 2009/0031766 | A1 | * | 2/2009 | Stobbe ............... B62H 5/003 70/263 |
| 2010/0228405 | A1 | * | 9/2010 | Morgal ............... B62H 3/00 701/1 |
| 2011/0209508 | A1 | | 9/2011 | Andersen |
| 2012/0215346 | A1 | | 8/2012 | Gingher |
| 2021/0323424 | A1 | * | 10/2021 | Montague ............ B62H 5/003 |
| 2023/0206315 | A1 | * | 6/2023 | Pain .................. B62H 5/003 705/307 |

FOREIGN PATENT DOCUMENTS

| | | |
|---|---|---|
| CA | 2064178 A1 | 9/1993 |
| CA | 2074997 A1 | 1/1994 |
| CA | 2081034 A1 | 4/1994 |
| CA | 2091726 A1 | 9/1994 |
| CA | 2162384 A1 | 12/1994 |
| CA | 2102339 A1 | 5/1995 |
| CA | 2124129 A1 | 11/1995 |
| CA | 2154033 A1 | 1/1996 |
| CA | 2209289 A1 | 7/1996 |
| CA | 2226325 A1 | 1/1997 |
| CA | 2230554 A1 | 3/1997 |
| CA | 2262979 A1 | 8/1997 |
| CA | 2046386 C | 2/1998 |
| CA | 2207588 A1 | 12/1998 |
| CA | 2142652 C | 1/1999 |
| CA | 2279709 A1 | 2/2000 |
| CA | 2279078 A1 | 8/2000 |
| CA | 2039435 C | 8/2001 |
| CA | 2352037 A1 | 12/2002 |
| CA | 2472976 A1 | 10/2005 |
| CA | 2260326 A1 | 4/2006 |
| CA | 2527616 A1 | 5/2006 |
| CA | 2519843 A1 | 3/2007 |
| DE | 4407804 A1 | 10/1994 |
| DE | 10301887 A1 | 7/2004 |
| DE | 202006004849 U1 | 6/2006 |
| DE | 102007012099 A1 | 12/2007 |
| EP | 1382519 A2 | 1/2004 |
| FR | 2764261 B1 | 8/1999 |
| FR | 2824942 A1 | 11/2002 |
| GB | 2383882 A | 7/2003 |
| JP | S6180384 A | 4/1986 |
| JP | 2000172747 A2 | 6/2000 |
| JP | 2001338238 A2 | 12/2001 |
| JP | 2002008128 A2 | 1/2002 |
| JP | 2002063646 A2 | 2/2002 |
| JP | 2002140763 A | 5/2002 |
| JP | 2003331395 A | 11/2003 |
| JP | 2005078223 A2 | 3/2005 |
| JP | 2005122675 A2 | 5/2005 |
| JP | 2005173993 A2 | 6/2005 |
| JP | 2005180161 A | 7/2005 |
| JP | 2005202900 A2 | 7/2005 |
| JP | 2005293402 A2 | 10/2005 |
| JP | 2006185402 A2 | 7/2006 |
| JP | 2006336262 A | 12/2006 |
| KR | 20020036319 A | 5/2002 |
| KR | 100806049 B1 | 2/2008 |
| KR | 2009/0008485 A | 1/2009 |
| WO | WO 2002/067210 A1 | 8/2002 |
| WO | WO 2005/049417 A1 | 6/2005 |
| WO | WO 2005/068280 A1 | 7/2005 |
| WO | WO 2005/077740 A1 | 8/2005 |
| WO | WO 2005/001781 A1 | 12/2005 |
| WO | WO 2006/014105 A1 | 2/2006 |
| WO | WO 2006/095092 A1 | 9/2006 |
| WO | WO 2006/120328 A1 | 11/2006 |
| WO | WO 2007/020308 A2 | 2/2007 |

OTHER PUBLICATIONS

Ricci, Lawrence; Low Power Design Makes Solar Power Practical for Montreal Parking System; Information Quarterly, vol. 3, No. 3, 2004, pp. 68-70 (3 pages).

International Search Report from corresponding application PCT/IB2009/005466, mailed Oct. 1, 2009 (4 pages).

European Search Report, Application No. 09721977.8 dated Apr. 20, 2011 (8 pages).

IT World Canada.com "Wireless, solar power drives Montreal bike rentals" Nov. 11, 2008 (1 page).

Office Action, U.S. Appl. No. 12/052,309, USPTO Apr. 28, 2010 (11 pages).

* cited by examiner

DOCKING STATION FOR MICROMOBILITY TRANSIT VEHICLES

TECHNICAL FIELD

One or more embodiments of the present disclosure relate generally to micromobility transit vehicles and more particularly, for example, to systems and methods for a docking station for one or more micromobility transit vehicles.

BACKGROUND

Parking (or docking) stations for micromobility vehicles for hire (e.g., shared scooters, sit-scooters, bicycles, etc.) are robust and represent a significant investment for a ridesharing company. These and other considerations limit the amount of parking stations that can be placed within a municipality or region. Legacy parking stations may also need to be updated with new or updated technology and/or features. It is also desirable to know a lock status of the micromobility transit vehicles within the docking station.

Therefore, there is a need in the art for systems and methods for a docking station that addresses the deficiencies noted above, other deficiencies known in the industry, or at least offers an alternative to current techniques. For example, improvements are needed to identify a lock condition of one or more micromobility transit vehicles parked within a docking station.

SUMMARY

Systems and methods are disclosed for a docking station for micromobility transit vehicles. In accordance with one or more embodiments, a multimodal transportation system is provided. The multimodal transportation system may include a micromobility transit vehicle including a lock cable, and a docking station adapted to secure the micromobility transit vehicle. The docking station may include a bollard for securing the lock cable to lock the micromobility transit vehicle to the docking station, and a dock module configured to detect a characteristic of the lock cable in response to insertion of the lock cable into the bollard.

In accordance with one or more embodiments, a docking station is provided. The docking station may include a rack configured to dock a micromobility transit vehicle, a bollard for securing the micromobility transit vehicle within the rack, and a dock module configured to detect a characteristic of a lock cable in response to insertion of the lock cable into the bollard.

In accordance with one or more embodiments, a method of detecting a lock characteristic of a micromobility transit vehicle secured to a docking station is provided. The method may include generating a current signal in response to insertion of a lock cable through an inductive coil assembly disposed in the docking station, associating the current signal to a characteristic of the lock cable, and identifying a type of the lock cable based on the associated characteristic.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the disclosure described herein and should not be construed as a complete depiction of the scope of the disclosure.

Embodiments of the disclosure and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, a docking station for micromobility transit vehicles is provided. The docking station includes one or more docks or racks in which to position a micromobility transit vehicle (e.g., kick scooter, sit-scooter, bicycle, etc.). Once the micromobility transit vehicle is in position, the micromobility transit vehicle may be locked to the docking station, such as passing a lock cable around and through a portion of the dock. An inductive coil assembly may be provided at each dock to detect the presence of the lock cable. For example, insertion of the lock cable through the inductive coil assembly (e.g., through a hole in a bollard of the dock) may affect the current flowing through the inductive coil assembly. Different types or amounts of material in the lock cable may exhibit different responses in the coil current. As a result, it can be detected whether a particular lock cable or cable type (e.g., a proprietary lock cable) has been secured to the docking station.

Various communications (e.g., Bluetooth low energy communications) may be provided at each dock to facilitate identification and other data transfers between the docking station and parked micromobility transit vehicles. A mat sensor (e.g., weight sensor, proximity sensor, etc.) may be provided at each dock to detect a parked micromobility transit vehicle. Additional sensors may be provided at each dock in various embodiments, such as radio frequency identification (RFID) readers, near field communication (NFC) readers, and/or others to facilitate further identification and/or communication.

The docking station may include a beacon. The beacon may include LTE, hardwired, and/or other connections to communicate with an external network and the individual docks. For example, the beacon may communicate with a micromobility transit network to monitor and communicate the status of vehicles that may be parked or locked at the docking station.

Figure 1:
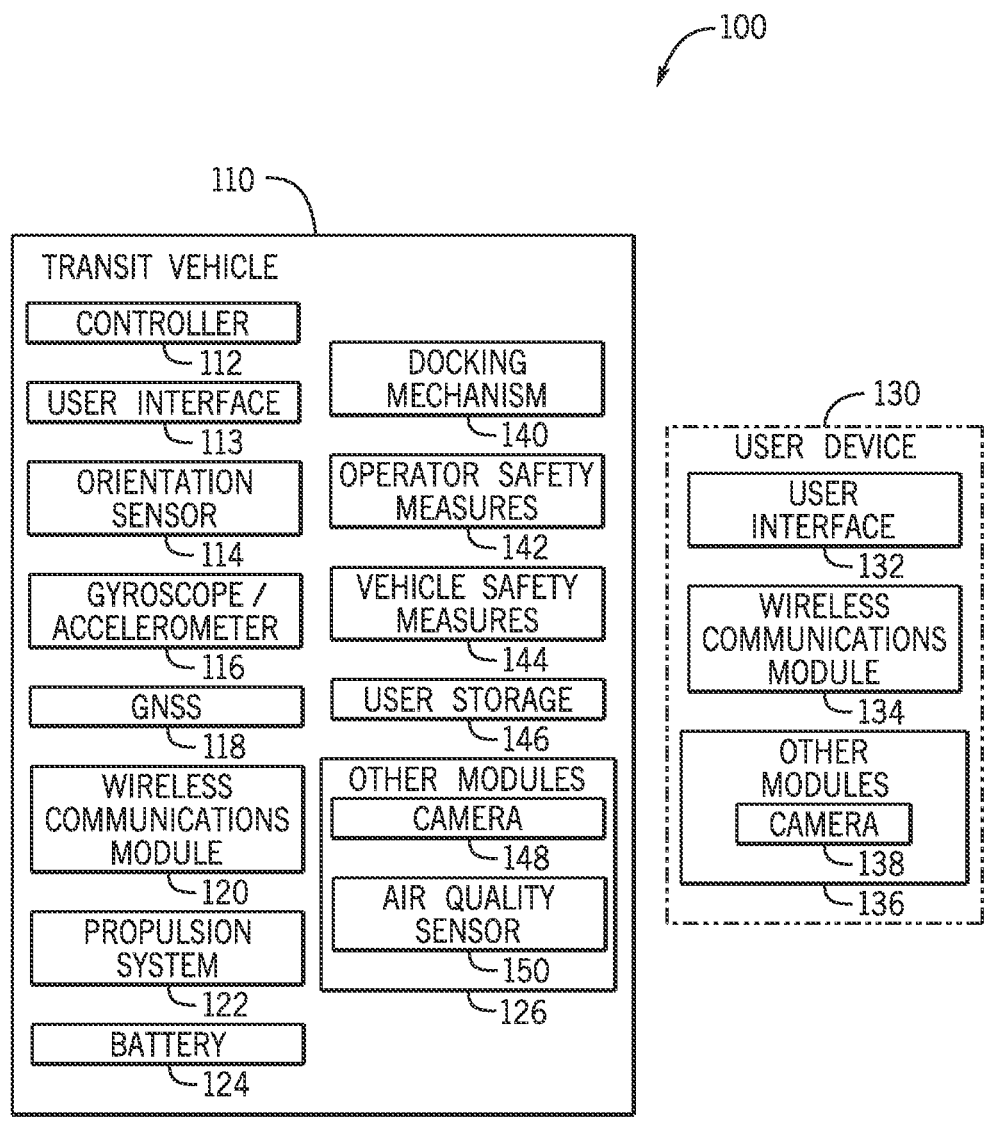
FIG. 1 illustrates a block diagram of a portion of a dynamic transportation matching system including a transit vehicle, in accordance with an embodiment of the disclosure.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radiofrequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
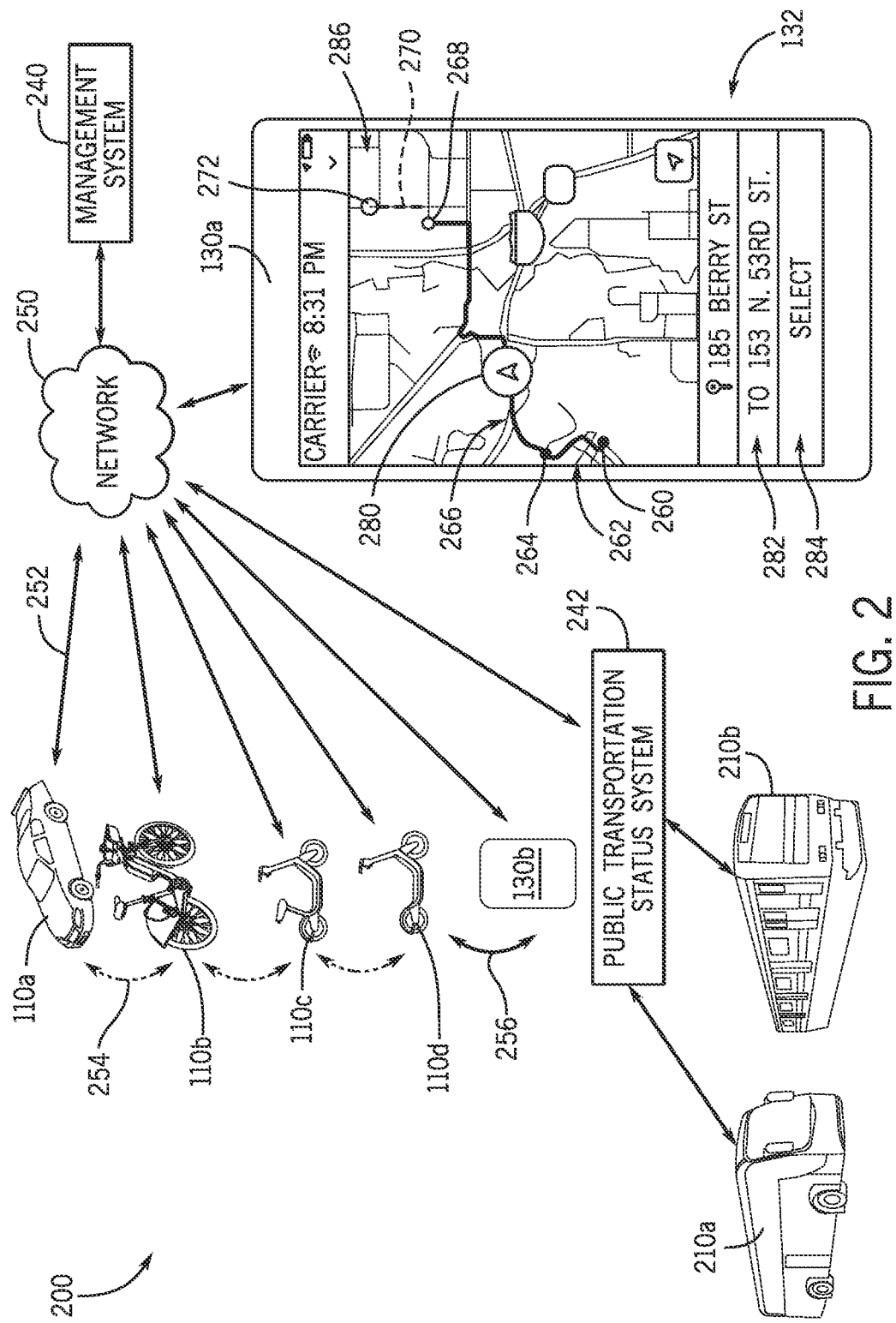
FIG. 2 illustrates a block diagram of a dynamic transportation matching system incorporating a variety of transportation modalities, in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or a from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
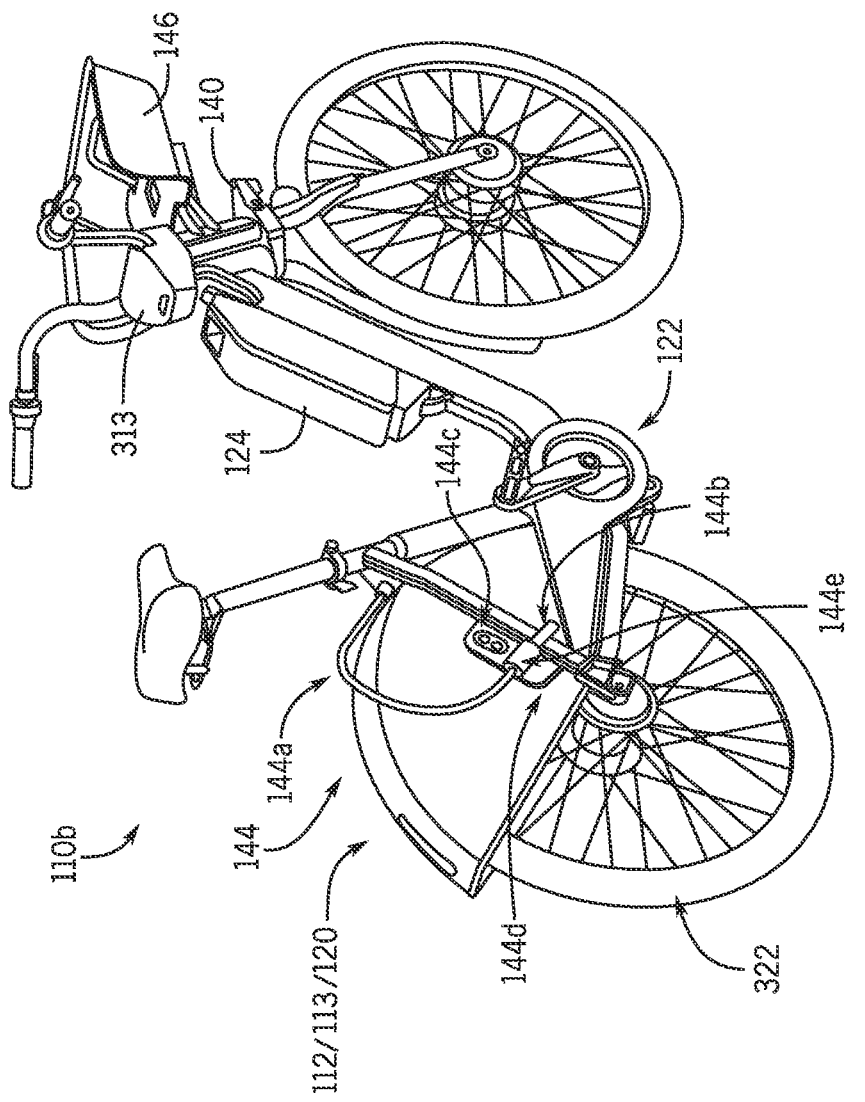
FIGS. 3A, 3B, and 3C illustrate respective diagrams of micromobility transit vehicles for use in a dynamic transportation matching system, in accordance with an embodiment of the disclosure.
Figure 3B:
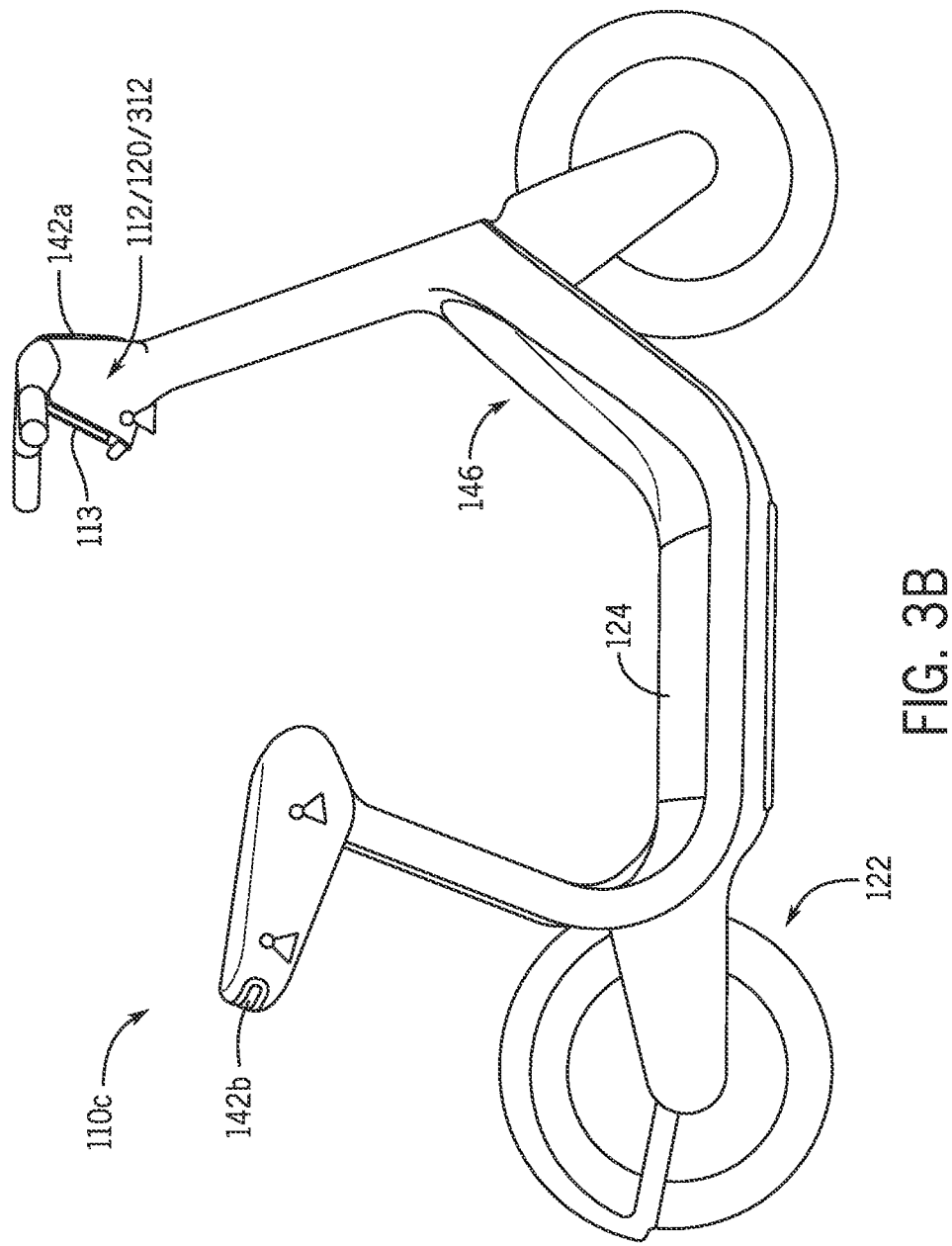
Figure 3C:
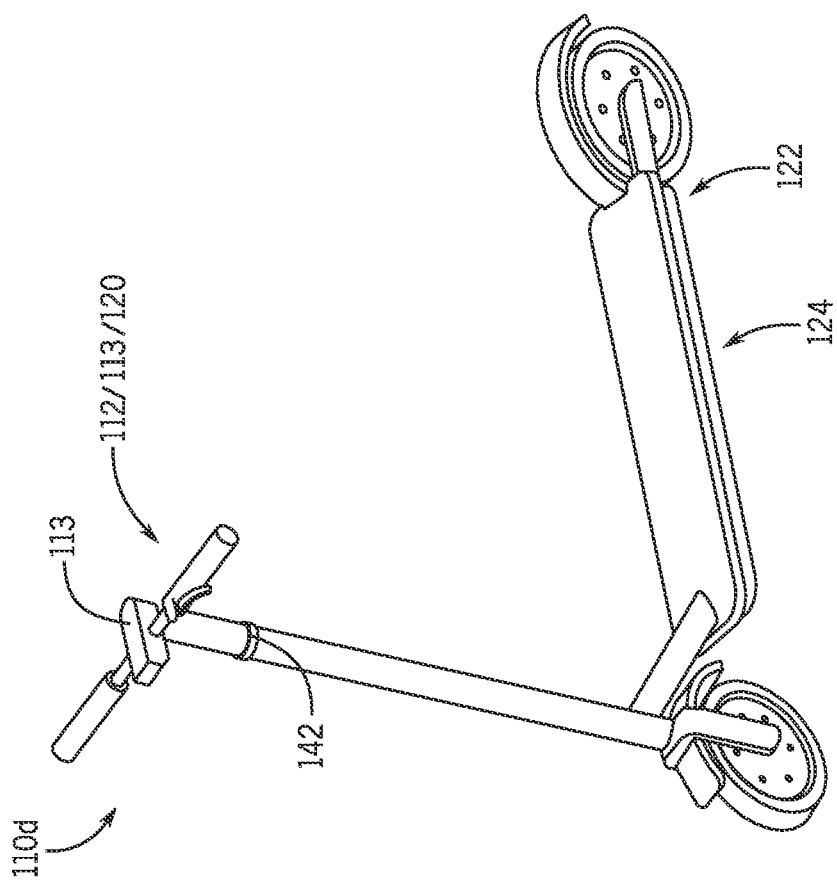

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a transportation requester or rider to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of head lights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
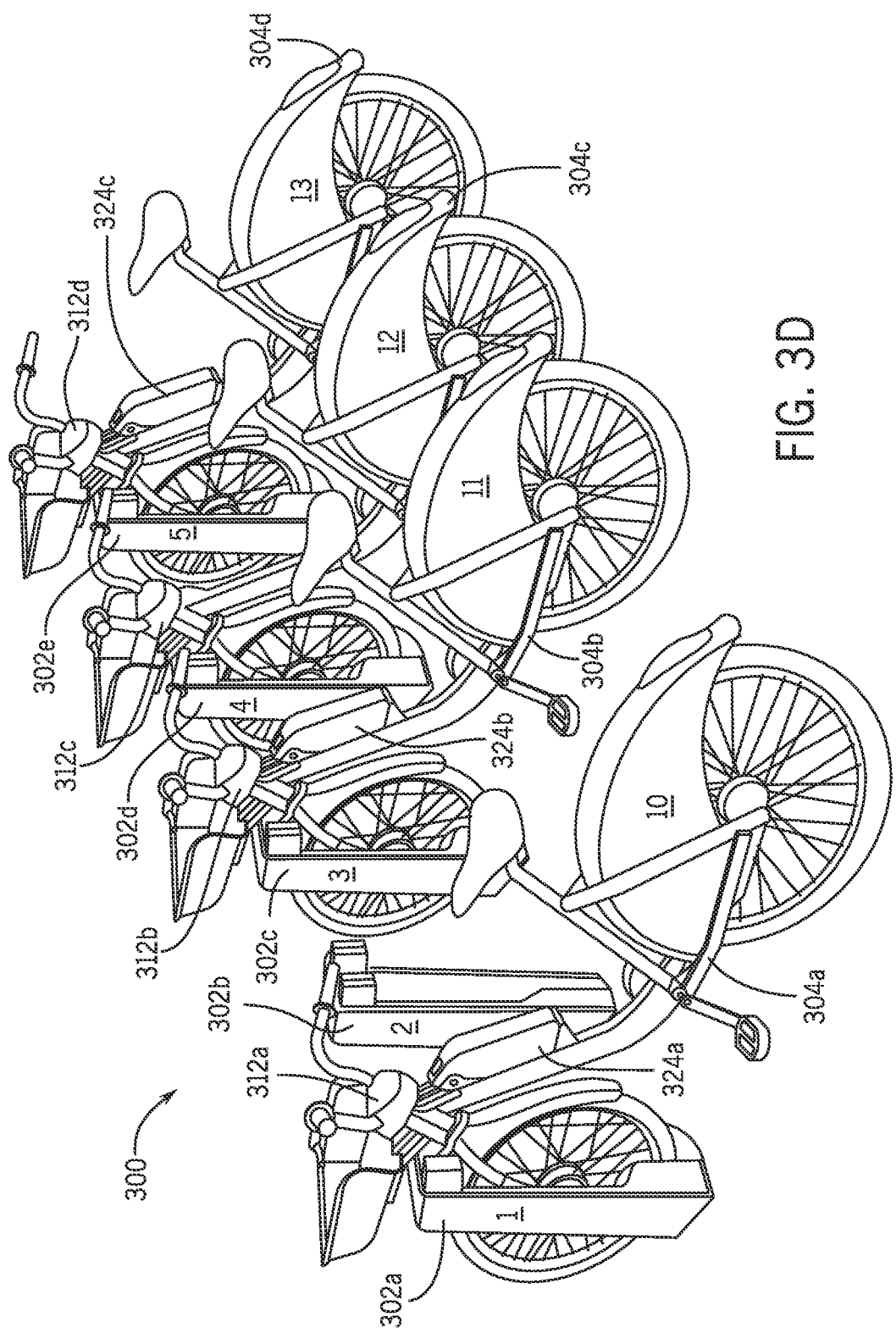
FIG. 3D illustrates a diagram of a docking station for docking one or more micromobility transit vehicles, in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A transportation requester or rider may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
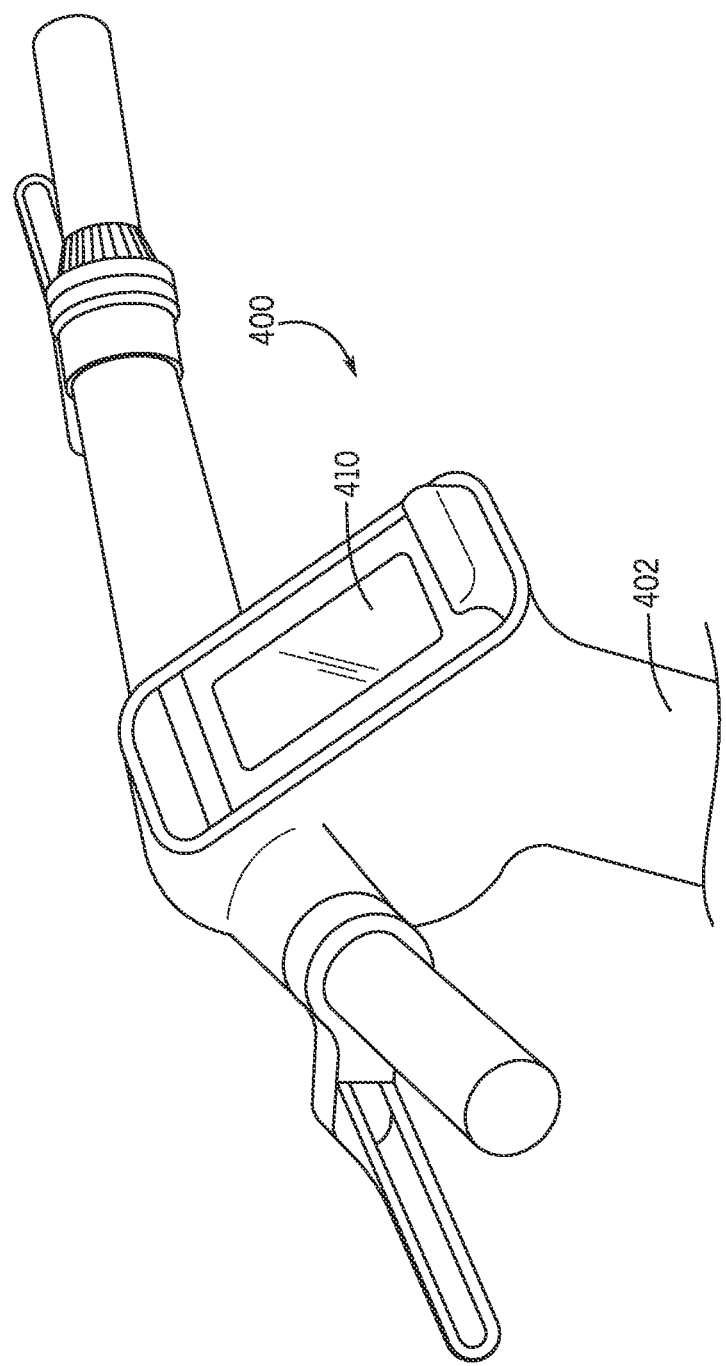
FIG. 4 illustrates a diagram of a user interface associated with a micromobility transit vehicle, in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S. patent application Ser. No. 16/578,995, entitled "MICROMOBILITY ELECTRIC VEHICLE WITH ELECTRONIC DEVICE HOLDER AND INTEGRATED DISPLAY," which is incorporated herein in its entirety for all purposes.

Figure 5A:
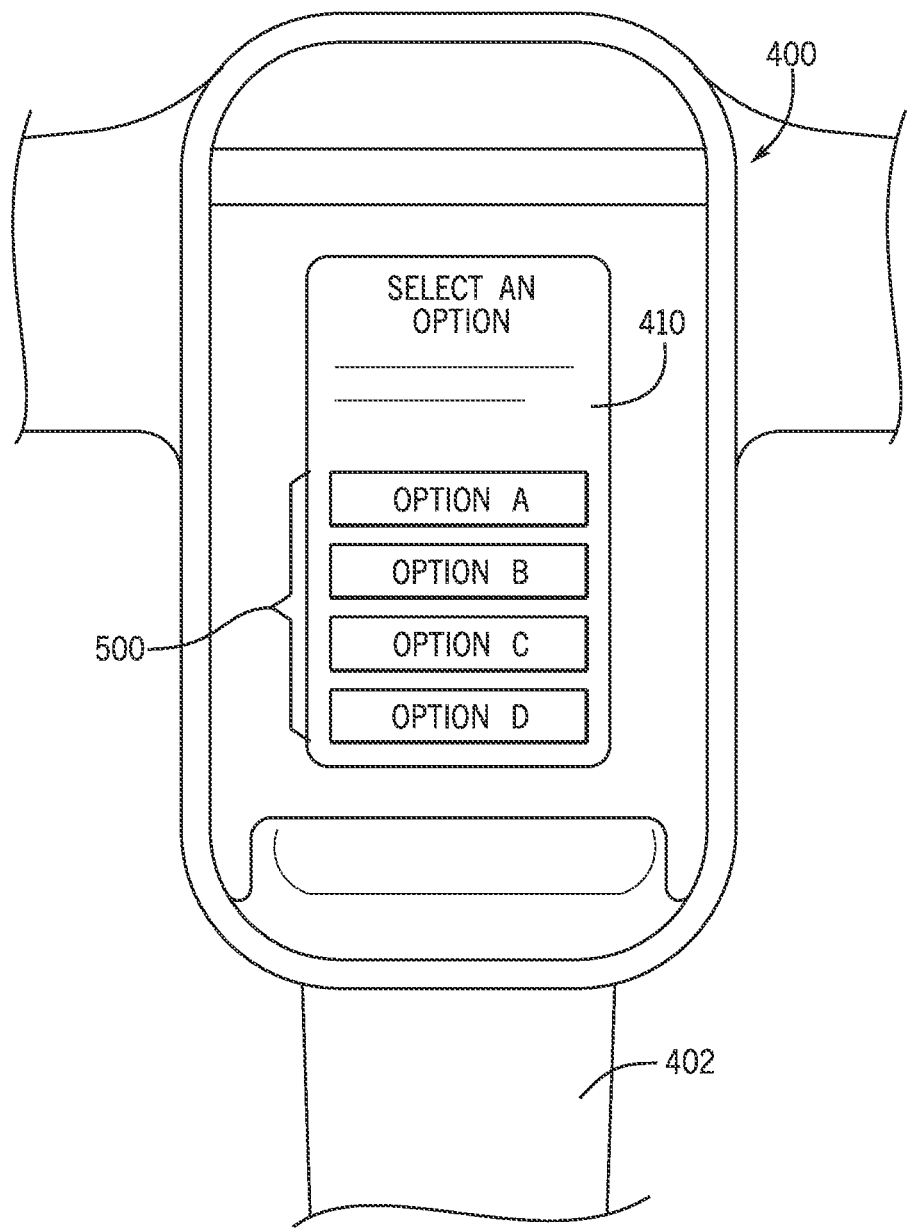
FIGS. 5A, 5B, and 5C illustrate respective diagrams of various examples of information rendered on a display of the user interface of FIG. 4, in accordance with an embodiment of the disclosure.
Figure 5B:
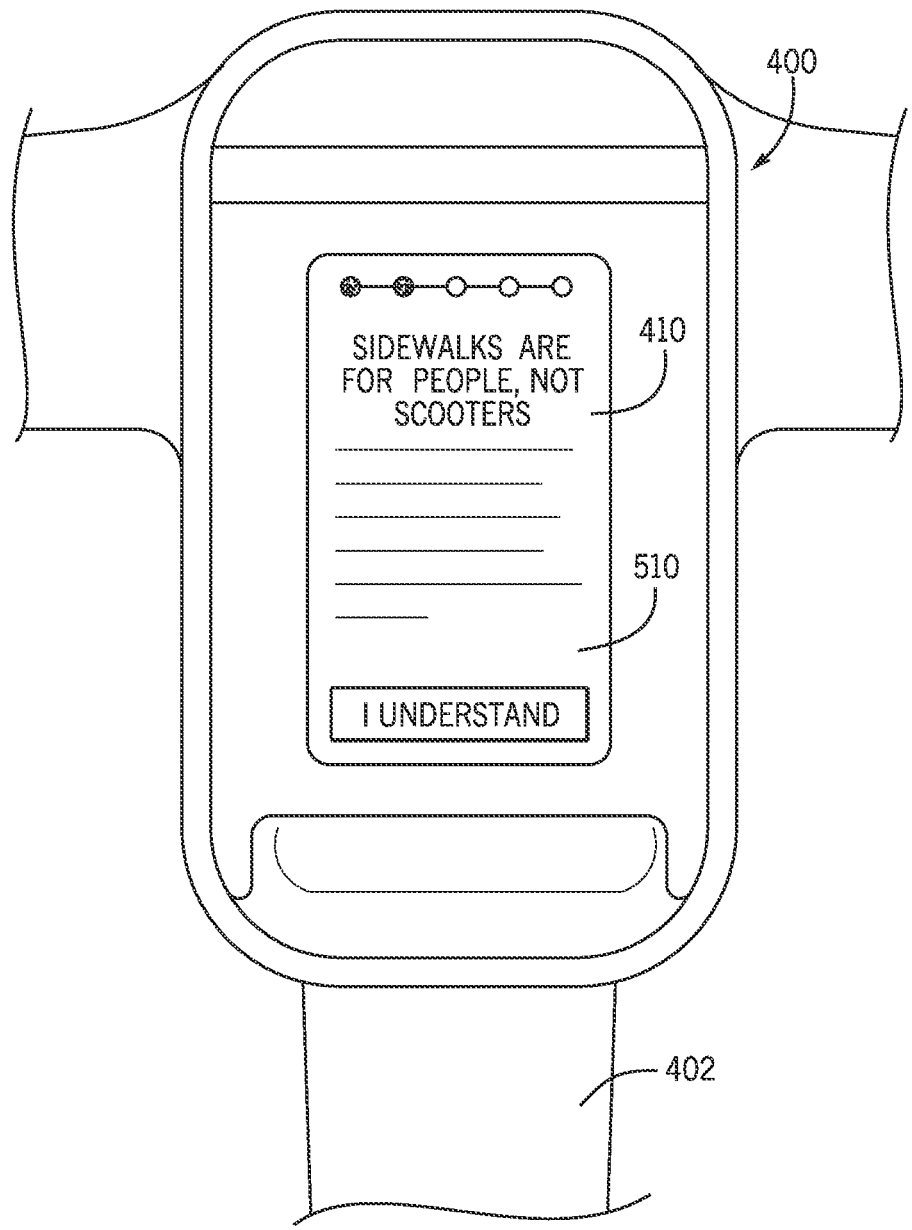
Figure 5C:
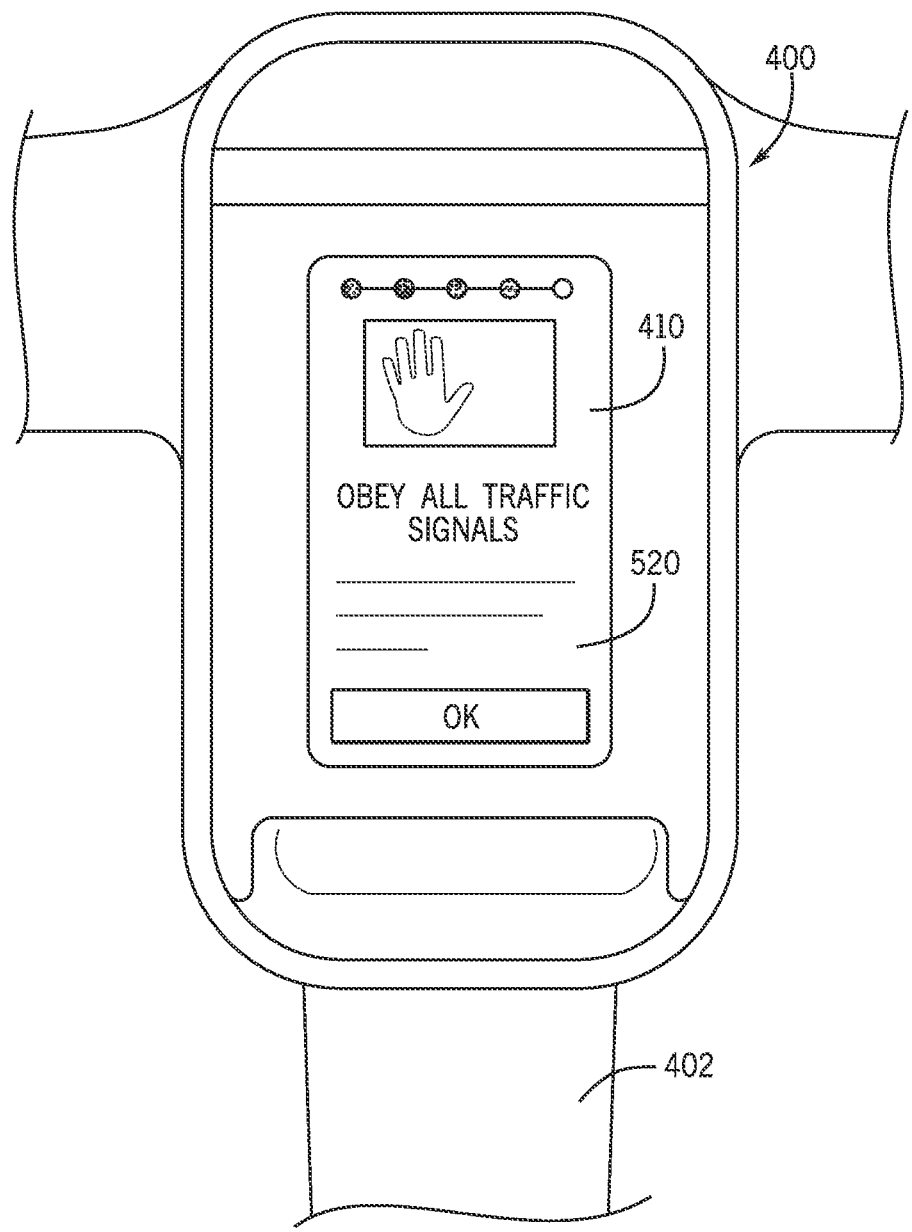

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
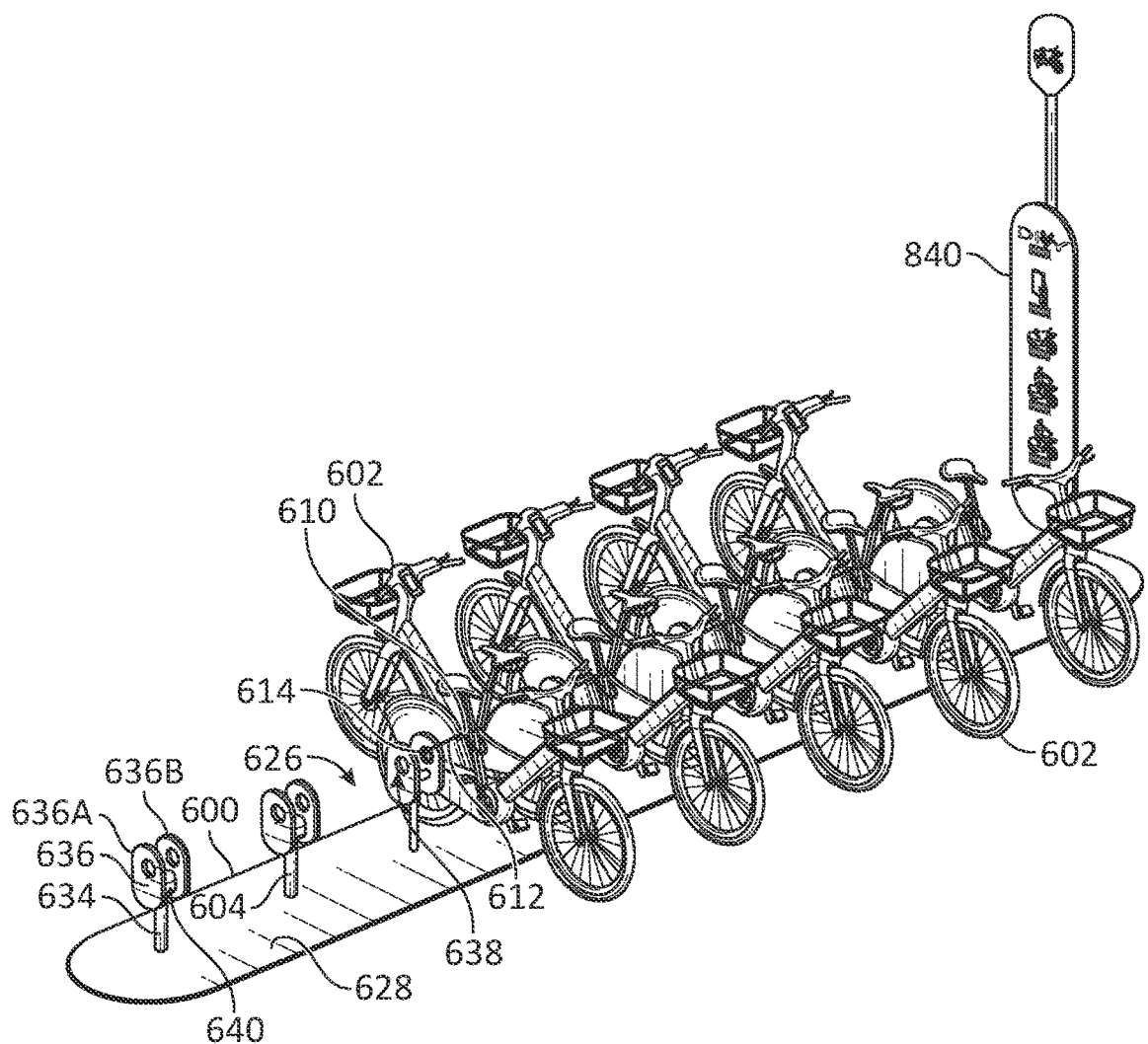
FIG. 6 illustrates a diagram of a docking station for docking one or more micromobility transit vehicles, in accordance with an embodiment of the disclosure.
Figure 7:
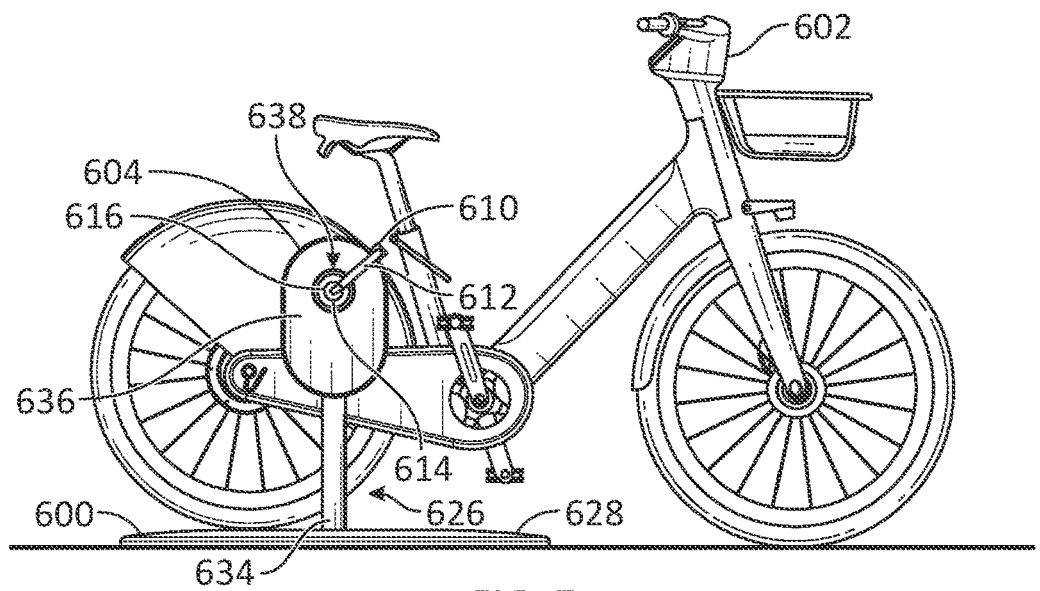
FIG. 7 illustrates a diagram of a micromobility transit vehicle secured to a bollard of the docking station of FIG. 6, in accordance with an embodiment of the disclosure.

FIG. 6 illustrates a diagram of a docking station 600 for docking one or more micromobility transit vehicles 602, in accordance with an embodiment of the disclosure. FIG. 7 illustrates a diagram of the micromobility transit vehicle 602 secured to a bollard 604 of the docking station 600, in accordance with an embodiment of the disclosure. The micromobility transit vehicle 602 may be similar to any one of transit vehicles 110b, 110c, or 110d, described above. For example, the micromobility transit vehicle 602 may include a lock assembly 610 including a lock cable 612, a locking pin 614 coupled to a free end of the lock cable 612, and a pin latch/insertion point 616 configured to receive and secure the locking pin 614 in place. In embodiments, the lock assembly 610 may include a holster 620 to receive and secure the locking pin 614 when not engaged with the pin latch 616, such as during transport or use of the micromobility transit vehicle 602 so that the locking pin 614 (and/or lock cable 612) is not at risk of becoming entangled with a moving part of the micromobility transit vehicle 602 (e.g., wheels, spokes, chain, etc.). To lock the micromobility transit vehicle 602, the locking pin 614 may be removed from the holster 620 and the lock cable 612 wrapped around and/or through a secure object (e.g., bike rack, pole, etc.) to secure the locking pin 614 to the pin latch 616.

The lock assembly 610 may be similar to the vehicle security device 144 described above and shown in FIG. 3A. For example, the lock cable 612, locking pin 614, pin latch 616, and holster 620 may be similar to the locking cable 144a, pin 144b, pin latch 144c, and holster 144e described above and shown in FIG. 3A.

Such configurations are exemplary only, and the lock assembly 610 may include other configurations. For example, the lock assembly 610 may be a cable lock, a U-bar lock (U-lock), a chain, or other lock type. As a result, lock cable 612 may refer to any device operable to secure the micromobility transit vehicle 602 to the bollard 604 of the docking station 600. As such, reference to lock cable 612 may refer to a flexible cable, a rigid bar or post, or a chain, among others.

The docking station 600 may be adapted to secure the micromobility transit vehicle 602. For instance, the docking station 600 may include one or more docks or racks 626 in which to park one or more micromobility transit vehicles 602. The docking station 600 may include multiple racks 626 each configured to receive one or more micromobility transit vehicles 602. Each rack 626 may include a platform 628 and the bollard 604 extending from the platform 628. The platform 628 may form a base of the docking station 600 to support the micromobility transit vehicle 602. Depending on the application, the platform 628 may include a mat, a tire recess for receiving a portion of a tire of the micromobility transit vehicle 602 (e.g., the rear tire, the front tire, etc.), or any combination thereof.

The platform 628 may position the micromobility transit vehicle 602 within the rack 626, such as adjacent to the bollard 604, or the like. For example, the platform 628 may situate the micromobility transit vehicle 602 for locking to the bollard 604. In embodiments, the platform 628 may align the micromobility transit vehicle 602 with the bollard 604. For instance, the platform 628 may be structured to align the lock assembly 610 of the micromobility transit vehicle 602 with a lock portion (e.g., a hole) of the bollard 604 when the micromobility transit vehicle 602 is positioned within the rack 626. In embodiments, the platform 628 may elevate the micromobility transit vehicle 602 to align the lock assembly 610 with the bollard 604, such that the pin latch 616 aligns with a portion (e.g., a hole) of the bollard 604 to enable locking with the locking pin 614 (see, e.g., FIG. 7). In embodiments, the lock portion of the bollard 604 may align with at least a portion of the lock assembly 610 when the micromobility transit vehicle 602 is positioned within the rack 626.

The bollard 604 may include many configurations for securing the lock cable 612 to lock the micromobility transit vehicle 602 to the docking station 600. As shown, the bollard 604 includes a stanchion 634 extending from the platform 628 and an anchor 636 connected to the stanchion 634. A hole 638 may be disposed in the bollard 604, such as disposed in the anchor 636. The lock cable 612 may be positionable within the hole 638 to wrap the lock cable 612 around a portion of the bollard 604 and lock the micromobility transit vehicle 602 to the docking station 600. For example, the lock cable 612 may be wrapped around the anchor 636 and inserted through the hole 638 for connection with the pin latch 616, although other configurations are contemplated.

Depending on the application, the bollard 604 may include one anchor 636 or multiple anchors 636. For example, the bollard 604 may include a first anchor 636A and a second anchor 636B. The first anchor 636A and second anchor 636B may be positioned on opposing sides of the stanchion 634. As shown, the bollard 604 may include a bar 640 connected to the top of the stanchion 634. The bar 640 may extend horizontally or generally horizontally, with the stanchion 634 connected to the bar 640 at or near the bar's midpoint. The first anchor 636A may be connected to one end of the bar 640, and the second anchor 636B may be connected to the opposite end of the bar 640. A first micromobility transit vehicle may be connected to the first anchor 636A, and a second micromobility transit vehicle may be connected to the second anchor 636B. As a result, multiple micromobility transit vehicles 602 may be secured to a single bollard 604. The first micromobility transit vehicle may be a first vehicle type, and the second micromobility transit vehicle may be a second vehicle type. The first vehicle type may be the same or different than the second vehicle type.

The bollard 604 may be configured to interface with one or more micromobility transit vehicles 602. For instance, the hole 638 may be sized, shaped, and/or positioned to align with the lock assembly 610 of the micromobility transit vehicle 602 to facilitate locking of the micromobility transit vehicle 602 to the bollard 604. In embodiments, a portion of the micromobility transit vehicle 602 may interface with the bollard 604 to secure the micromobility transit vehicle 602 in place. For example, a portion of the lock assembly 610 may interface with the bollard 604, such as in a manner described above or in other configurations. In embodiments, a vertical position of the hole 638 disposed within the anchor 636 may be set at a height similar or identical to the height of the pin latch 616 when the micromobility transit vehicle 602 is positioned within docking station 600, such as situated on the platform 628 of a rack 626. A lateral position of the hole 638 disposed within the anchor 636 may be set to align with the pin latch 616 when the micromobility transit vehicle 602 is positioned within the docking station 600. Once the pin latch 616 is aligned with the hole 638 of the bollard 604, the lock cable 612 may be passed through the hole 638 to engage the locking pin 614 with the pin latch 616 to lock the micromobility transit vehicle 602 to the bollard 604.

The docking station 600 may include a lightweight characteristic, such as having a smaller footprint, form factor, visual weight, among others, or any combination thereof compared to legacy stations. Visual weight may refer to the docking station's appearance of mass (i.e., visual mass), visual impact, or visual characteristic of attracting and interacting with an observer's eye or vision. The lightweight characteristic may facilitate installation or placement of the docking station 600 in a variety of locations, such as allowing installation/placement of the docking station 600 in areas with relatively small size constraints. The lightweight characteristic may satisfy the design guidelines of municipalities and may appeal to the public and/or transportation requesters or riders, such as in a greater manner compared to legacy systems.

The lightweight characteristic may be the result of many configurations. For example, the docking station 600 may include a smaller number of elements, similar elements with smaller dimensions/weight, one or more elements having a combination of features, or any combination thereof compared to legacy systems. In embodiments, one or more structures or elements of the docking station 600 may be minimized in size and/or shape while still providing adequate strength for securing micromobility transit vehicle 602.

The docking station 600 may be adjustable and/or modular to tailor the docking station 600 to a location, requirement, locale-specific regulation, or the like. As one example, multiple racks 626 may be connected to define the docking station 600 of a desired size (e.g., greater number of racks 626 connected to define a larger docking station 600 suited for a larger area, smaller number of racks 626 connected to define a smaller docking station 600 suited for a smaller area, etc.). The racks 626 may be connected end-to-end until the docking station 600 has a desired size. The modularity of the docking station 600 may allow one or more racks 626 to be added to or removed from the docking station 600, such as after initial installation or assembly, based on use, demand, changing requirements or regulations, or the like.

The docking station 600 may be positioned for a desired sighting and/or layout. For example, the docking station 600 may be positioned within or near the curb of a street, on a sidewalk, within a public space, etc. The docking station 600 may be configured to allow or promote bi-directional parking or directional parking. For instance, the docking station 600 may be configured or positioned to allow one or more micromobility transit vehicles 602 to be parked nose-in from one or both sides of the docking station 600.

The bollard 604 may be positioned within the rack 626 to tailor or adjust the docking station 600 to a location or installation requirement. In embodiments, the bollard 604 may be rotated to adjust the angular position of the micromobility transit vehicle 602 within the docking station 600. For example, the bollard 604 may be situated in a first position to orient one or more micromobility transit vehicles 602 orthogonal or generally orthogonal to the length of the docking station 600. Such configurations may facilitate access to the micromobility transit vehicles 602 locked to the docking station 600 and/or docking of the micromobility transit vehicles 602 to the docking station 600. Such configurations may be useful or ideal when the docking station 600 is placed on large sidewalks, plazas, or public spaces, etc.

The bollard 604 may be situated in a second position to orient one or more micromobility transit vehicles 602 at a non-orthogonal angle within the docking station 600. For instance, the bollard 604 may be rotated to orient one or more micromobility transit vehicles 602 at a 35-degree angle or a 45-degree angle, among other angles, relative to the length of the docking station 600. Such configurations may maximize or increase a density of micromobility transit vehicles 602 within the docking station 600. Such configurations may be useful or ideal when the docking station 600 is placed in smaller spaces, such as reclaimed parking spots.

Figures 8A, 8B:
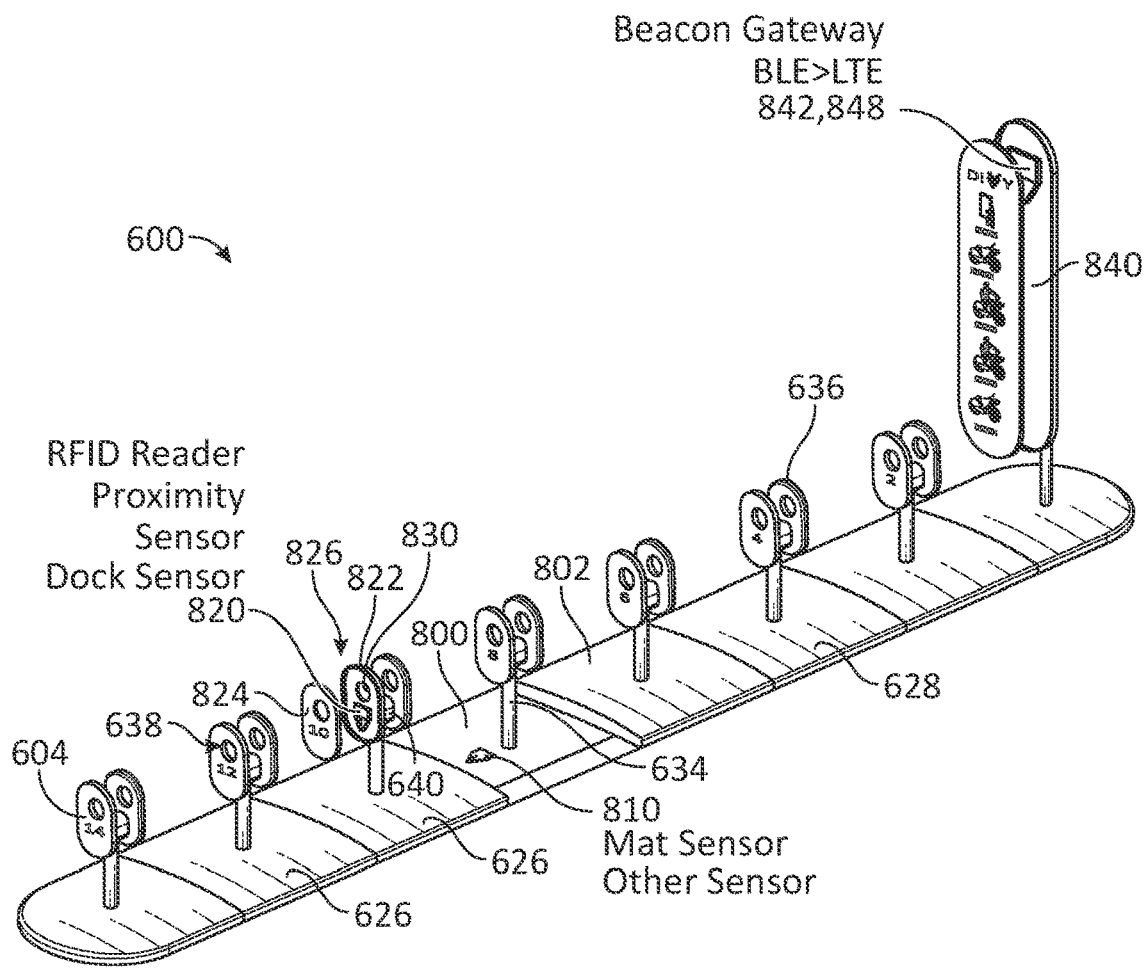
FIG. 8A illustrates a diagram of a partial cutaway and partial exploded view of the docking station of FIG. 6, in accordance with an embodiment of the disclosure.
FIG. 8B illustrates a diagram of an exploded view of a bollard of the docking station, in accordance with an embodiment of the disclosure.

FIG. 8A illustrates a diagram of a partial cutaway and partial exploded view of the docking station 600, in accordance with an embodiment of the disclosure. Referring to FIG. 8A, the platform 628 may include a substructure 800 and a mat 802 surrounding or overlaid on the substructure 800. The substructure 800 may be a rugged (e.g., galvanized steel) base providing a foundation for the bollard 604. The stanchion 634 may be attached or secured to the substructure 800 to provide sufficient strength and rigidity to the bollard 604. Depending on the application, the substructure 800 may be bolted down for permanent or semi-permanent installation.

The mat 802 may be a durable rubber mat. The mat 802 may create a distinct station footprint, hiding the robust substructure 800 and creating a more approachable feel to the docking station 600. In embodiments, the mat 802 and substructure 800 may define a thickness of the platform 628, with edges of the mat 802 providing a ramp-like feature to aid insertion of micromobility transit vehicle 602 into the docking station 600. In this manner, the mat 802 and/or substructure 800 may provide the elevational and/or lateral positioning of the micromobility transit vehicle 602 described above to align the pin latch 616 of the micromobility transit vehicle 602 with the hole 638. In embodiments, one or more tire recesses may be disposed in the mat 802 to align, position, and/or secure the micromobility transit vehicle 602 within the docking station 600.

With continued reference to FIG. 8A, the docking station 600 may include one or more sensors configured to detect one or more characteristics of the docking station 600 and/or micromobility transit vehicle 602. As shown, the docking station 600 may include a mat sensor 810 configured to detect a presence of a vehicle parked on the mat 802 of the docking station 600. In some embodiments, the mat sensor 810 may be configured to detect an unwarranted removal of the vehicle from the mat 802 for determining a tampering condition of the vehicle. For example, an unanticipated or unwarranted removal of micromobility transit vehicle 602 from the docking station 600 may indicate the vehicle is being tampered with (e.g., vandalized, stolen, etc.). in such conditions, a tampering signal may be generated and sent to an external device/network and/or the micromobility transit vehicle 602. In response to a determination that the vehicle is being tampered with, a location module of the vehicle (e.g., GPS) may be activated for locating the vehicle. The mat sensor 810 may be a weight sensor or a proximity sensor, among others. The mat sensor 810 may be positioned between the substructure 800 and the mat 802 to detect a pressure change against the substructure 800. For example, the mat sensor 810 may detect a weight of the micromobility transit vehicle 602 when positioned, at least partially, on the mat 802. As a result, the docking station 600 may be configured to detect a presence of one or more micromobility transit vehicles 602 parked within the docking station 600.

In embodiments, the docking station 600 may include a dock sensor 820. The dock sensor 820 may include any number of sensors, readers, or modules. For example, the dock sensor 820 may include a proximity sensor, Bluetooth low energy (BLE) communications, a radio-frequency identification (RFID) reader, a near field communication (NFC) reader, or other sensing devices, or any combination thereof. In embodiments, the docking station 600 may include a dock module 830. The dock module 830 may be configured to detect one or more components or characteristics of the micromobility transit vehicle 602. For example, the dock module 830 may be configured to detect a lock characteristic of the micromobility transit vehicle 602, as described below. In some embodiments, the dock module 830 may be disposed around the hole 638 to detect a characteristic of the lock cable 612 positioned through the hole 638. Such embodiments are illustrative only, and the dock module 830 may be configured to detect other components or characteristics. For instance, the dock module 830 may detect an alignment between the hole 638 and a portion of the lock assembly 610, such as an alignment between the hole 638 and pin latch 616, an alignment between the hole 638 and the lock cable 612, an alignment between the hole 638 and the locking pin 614, an alignment between the hole 638 and the holster 620, or the like. In some embodiments, the dock module 830 may be configured to detect other components of micromobility transit vehicle 602 (e.g., frame, wheel, etc.).

FIG. 8B illustrates a diagram of an exploded view of bollard 604, in accordance with an embodiment of the disclosure. Referring to FIGS. 8A and 8B, the dock sensor 820 may be associated with the anchor 636 of the bollard 604. For example, the anchor 636 may be a two-part assembly with a base 822 attached to the bar 640 and a cover 824 attached to the base 822. A space 826 may be defined within the anchor 636 between the base 822 and the cover 824 to receive dock sensor 820. In embodiments, the space 826 may allow for future sensor upgrades, such as adding one or more sensors within the space 826. As shown in FIG. 8B, anchor 636 may include a housing 832 within the space 826 between base 822 and cover 824 to receive dock sensor 820. Depending on the application, bar 640 may be welded to stanchion 634, and base 822 may be fastened to bar 640, although other configurations are contemplated. Cover 824 may be secured to base 822 via fasteners, corresponding retention features (e.g., snap-fit), or other securement mechanisms. Stanchion 634, bar 640, and base 822 may be formed from metal (e.g., 304 Stainless Steel or 6061 Aluminum), and cover 824 may be formed from thermoformed plastic (e.g., PC-ABS or another thermoplastic).

With continued reference to FIG. 8A, the docking station 600 may include a beacon 840. The beacon 840 may be a panel, sign, or other structure visually distinguishing the docking station 600. The beacon 840 may include signage identifying the docking station 600 and providing important procedures, instructions, or notifications. The beacon 840 may include instructions or tips related to unlocking the micromobility transit vehicle 602 from the docking station 600, locking the micromobility transit vehicle 602 to the docking station 600, docking the micromobility transit vehicle 602, and/or riding the micromobility transit vehicle 602. In embodiments, the beacon 840 may illuminate the docking station 600. In embodiments, the beacon 840 may include a camera or other monitoring device to monitor a status of the docking station 600. The beacon 840 may include one or more communication modules, such as a BLE antenna and/or a long-term evolution (LTE) antenna, to communicate with the racks 626, the micromobility transit vehicles 602 in the docking station 600, or an external network, as described below.

The beacon 840 may include one or more sensors or modules. For example, the beacon 840 may include a communications module 842 to facilitate identification of the micromobility transit vehicle 602 and one or more data transfers between the micromobility transit vehicle 602 and the docking station 600. The communications module 842 may determine or detect one or more characteristics of the micromobility transit vehicle 602 and/or the docking station 600, such as the condition or status of the micromobility transit vehicles 602 in the docking station 600, a locking condition of one or more micromobility transit vehicles 602 in the docking station 600, how many micromobility transit vehicles 602 are parked in the docking station 600, what type or types of micromobility transit vehicles 602 are parked in the docking station 600, how many racks 626 are available in the docking station 600, or the like.

Depending on the application, the communications module 842 may include at least one of a BLE module, an RFID reader, or an NFC reader. The Bluetooth low energy module, RFID reader, and/or NFC reader may pair with the micromobility transit vehicle 602 to identify the micromobility transit vehicle 602 and/or communicate with the micromobility transit vehicle 602 when docked within the docking station 600.

In embodiments, the beacon 840 may include a network module 848 to facilitate communications between the docking station 600 and a network, such as a micromobility transit network (e.g., management system 240). The network module 848 may upload data to, and receive data from, the network. For example, the status or condition of the docking station 600 and/or the micromobility transit vehicles 602 docked therein may be provided to the network via network module 848. The network module 848 may communicate with the network to monitor and communicate the status of vehicles that may be parked or locked at the docking station 600. The network module 848 may communicate with the network through wired or wireless communication links or protocols.

Figure 9:
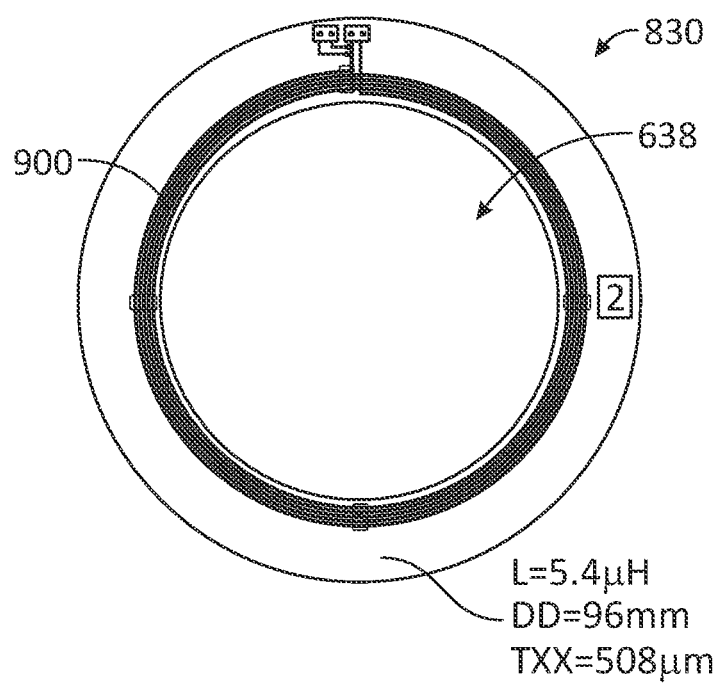
FIG. 9 illustrates a diagram of a dock module configured to detect a characteristic of a lock cable secured to the docking station, in accordance with an embodiment of the disclosure.

FIG. 9 illustrates a diagram of the dock module 830 of docking station 600, in accordance with an embodiment of the disclosure. The dock module 830 may be configured to detect a characteristic of the lock cable 612 when secured to the bollard 604. For example, the dock module 830 may detect a presence of the lock cable 612 through the hole 638, a type of the lock cable 612 positioned through the hole 638, or the like. As shown, the dock module 830 includes an inductive coil assembly 900. The inductive coil assembly 900 may be disposed at least partially around the hole 638, such that receipt of the lock cable 612 within the hole 638 positions the lock cable 612 through the inductive coil assembly 900. Receipt of the lock cable 612 at least partially within the inductive coil assembly 900 may alter the signal provided by the inductive coil assembly 900. For example, insertion of the lock cable 612 through the inductive coil assembly 900 may affect the current flowing through the inductive coil assembly 900.

The change in signal, as well as the signal signature, may indicate the presence and type of the lock cable 612 within the inductive coil assembly 900. For example, different types of material in, different amounts of material in, or different structures of the lock cable 612 may exhibit different responses in the coil current. As a result, it can be detected whether a particular cable or cable type (e.g., a proprietary lock cable) has been secured to the docking station 600.

FIGS. 10A, 10B, 10C, and 10D illustrate diagrams of respective signal signatures 1000 detectable by the dock module 830 and associated with different types of lock mechanisms, in accordance with an embodiment of the disclosure. The signal signatures 1000 may be detectable by magnitude over time. For example, the inductive coil assembly 900 may detect the change in current flowing through the inductive coil assembly 900 over time, such as detecting the change in current flowing through the inductive coil assembly 900 during the time the lock cable 612 is inserted through the hole 638 and inductive coil assembly 900. Such examples are exemplary only, and the signal signatures 1000 may be associated with other characteristics of the signal generated by the inductive coil assembly 900, such as voltage, frequency, etc.

Figure 10A:
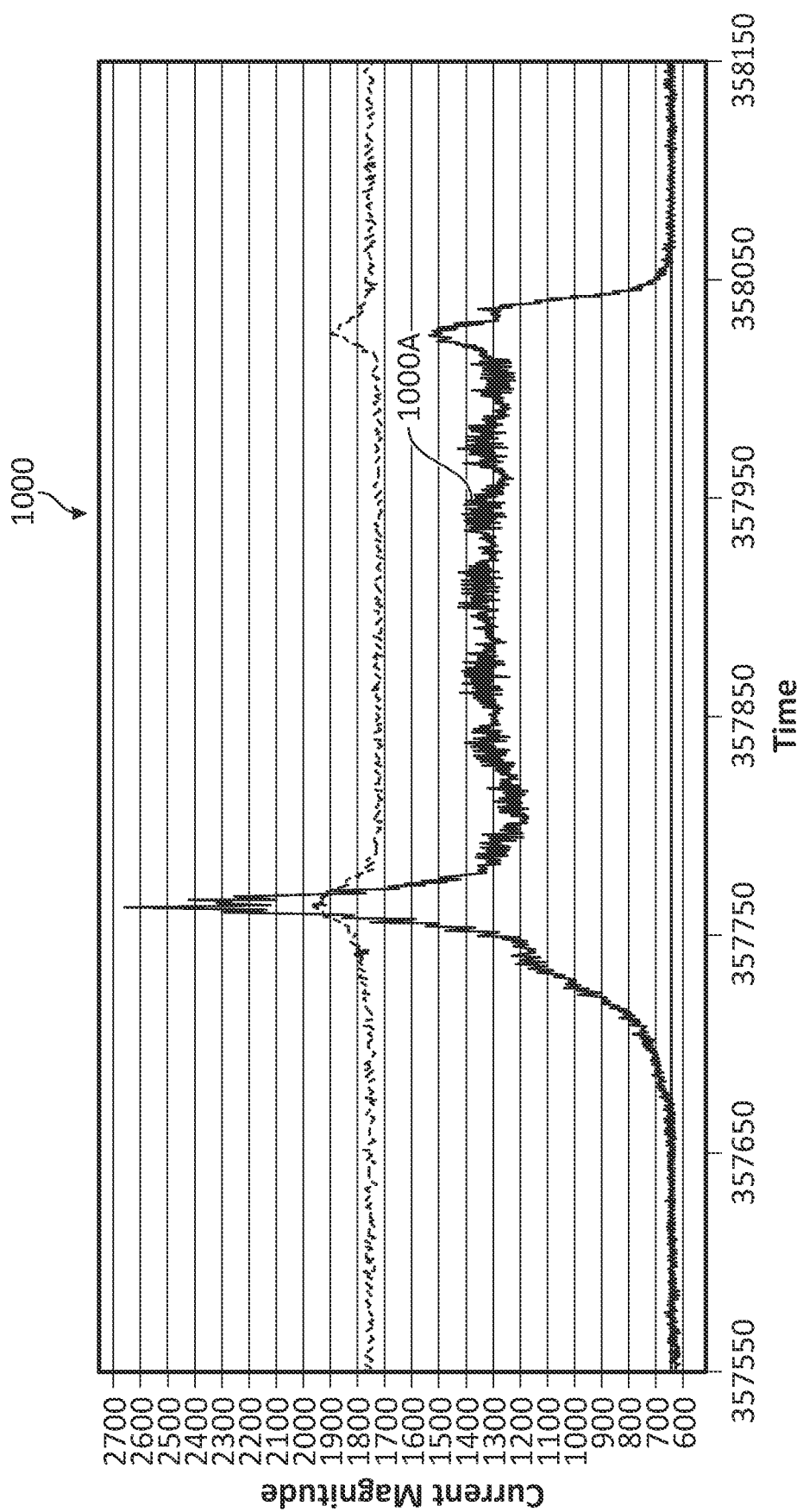
FIGS. 10A, 10B, 10C, and 10D illustrate diagrams of respective signal signatures detectable by the dock module and associated with different types of lock mechanisms, in accordance with an embodiment of the disclosure.

FIG. 10A illustrates a diagram of a first signal signature 1000A detectable by the dock module 830 when the lock cable 612 is inserted and positioned at least partially within the hole 638. The first signal signature 1000A may be associated with a first cable lock, such as a cable lock of a first type or manufacturer. For example, the first cable lock may be a proprietary cable lock. A proprietary cable lock may be made of particular materials associated with particular current responses that distinguish the cable lock from a nonproprietary cable lock made of different materials with different current responses. Detection of the first signal signature 1000A may indicate the micromobility transit vehicle 602 is being locked with the first cable lock, or at least a portion of the first cable lock is positioned within the hole 638 of the bollard 604.

Figure 10B:
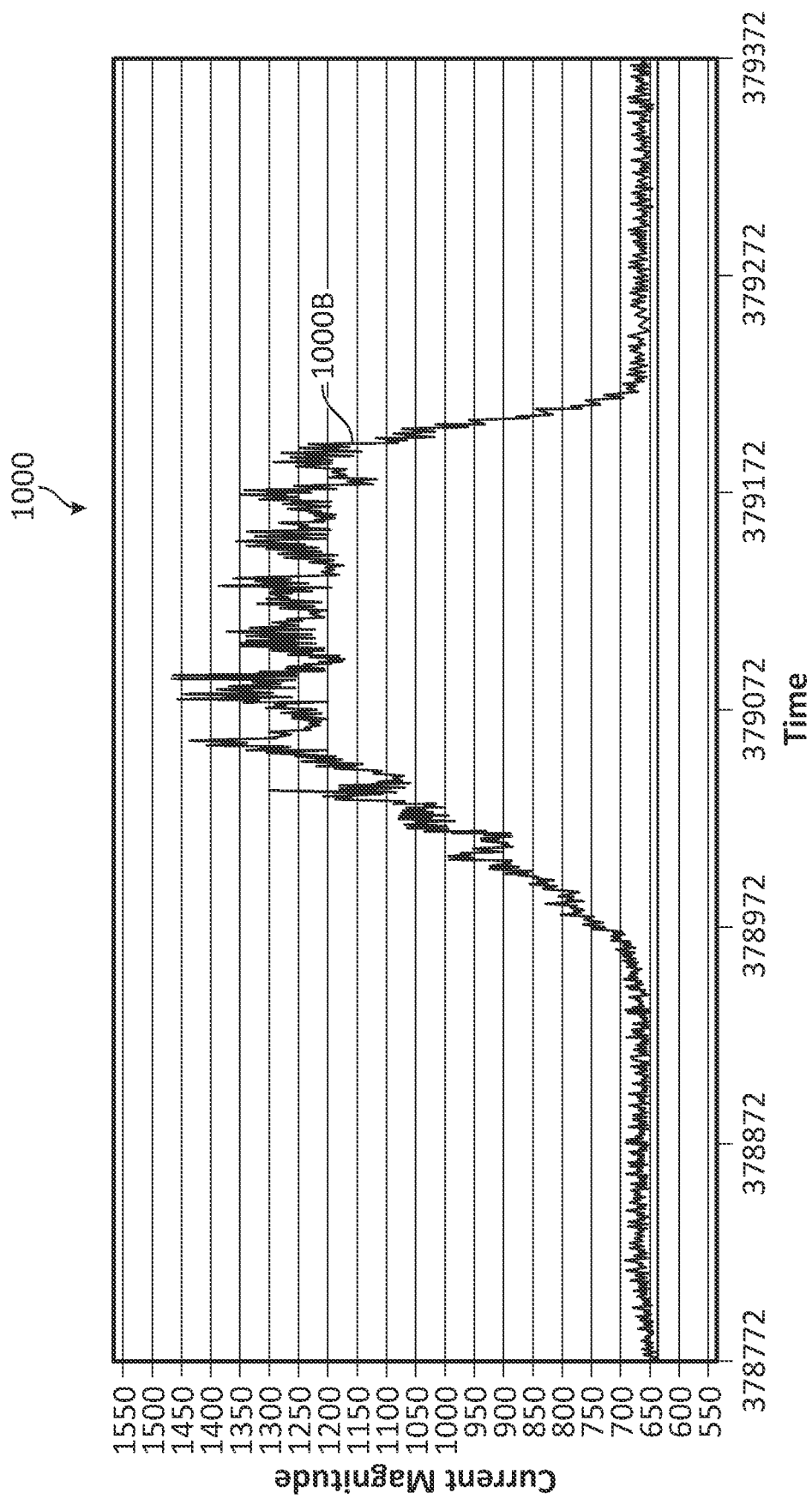

FIG. 10B illustrates a diagram of a second signal signature 1000B detectable by the dock module 830 when the lock cable 612 is inserted and positioned at least partially within the hole 638. The second signal signature 1000B may be associated with a second cable lock, such as a cable lock of a second type or manufacturer. For example, the second cable lock may be a cable lock from a competing manufacturer, or an off-the-shelf cable lock. Detection of the second signal signature 1000B may indicate the micromobility transit vehicle 602 is being locked with the second cable lock, or at least a portion of the second cable lock is positioned within the hole 638 of the bollard 604.

Figure 10C:
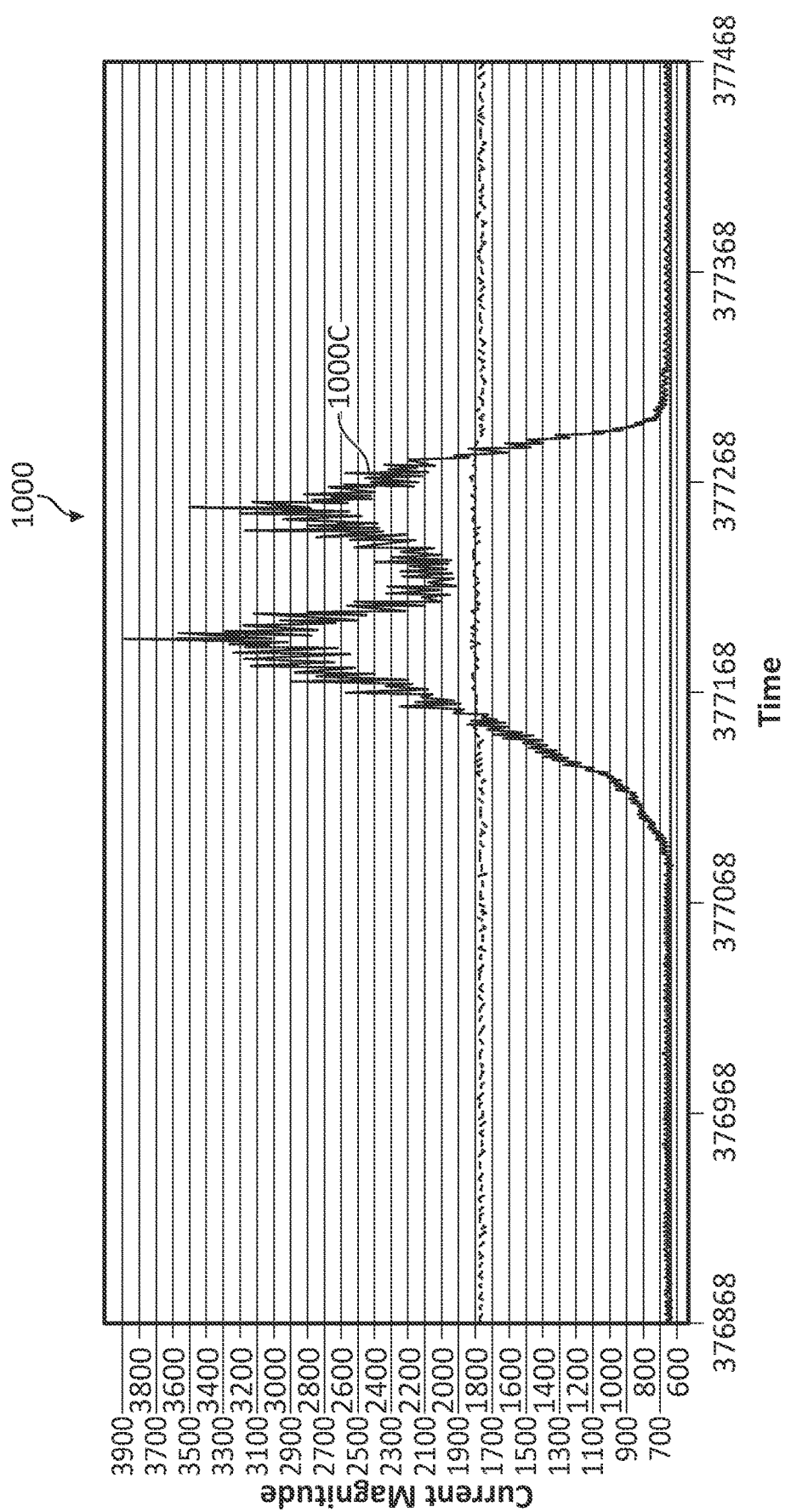

FIG. 10C illustrates a diagram of a third signal signature 1000C detectable by the dock module 830 when the lock cable 612 is inserted and positioned at least partially within the hole 638. The third signal signature 1000C may be associated with a first U-lock, such as a U-lock of a first type or manufacturer. Detection of the third signal signature 1000C may indicate the micromobility transit vehicle 602 is being locked with the first U-lock, or at least a portion of the first U-lock is positioned within the hole 638 of the bollard 604.

Figure 10D:
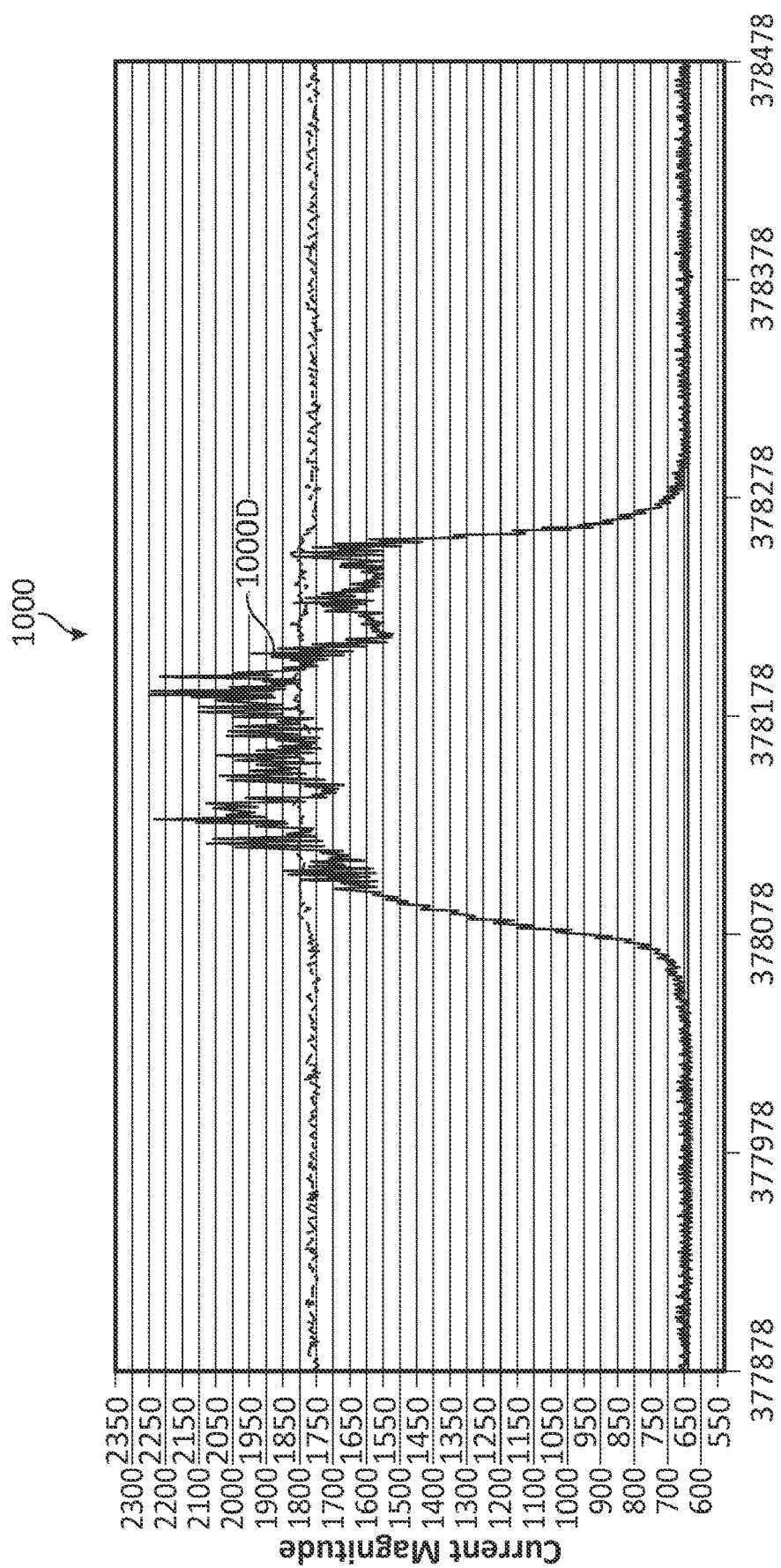

FIG. 10D illustrates a diagram of a fourth signal signature 1000D detectable by the dock module 830 when the lock cable 612 is inserted and positioned at least partially within the hole 638. The fourth signal signature 1000D may be associated with a second U-lock, such as a U-lock of a second type or manufacturer. Detection of the fourth signal signature 1000D may indicate the micromobility transit vehicle 602 is being locked with the second U-lock, or at least a portion of the second U-lock is positioned within the hole 638 of the bollard 604. FIGS. 10A-10D illustrate exemplary signal signatures only. Additional or other signal signatures 1000 may be detectable depending on the type and manufacturer of the lock cable 612.

In embodiments, the docking station 600 may include a logic device. The logic device may be configured to identify a type of the lock cable 612 inserted through the hole 638 of the bollard 604. The logic device may be configured to associate one or more signals received from the inductive coil assembly 900 with a signal signature stored for a lock cable type to identify the type of the lock cable 612 inserted through the hole 638 of the bollard 604. For example, a signal received from the inductive coil assembly 900 when lock cable 612 is inserted through the hole 638 may resemble the first signal signature 1000A, the second signal signature 1000B, the third signal signature 1000C, the fourth signal signature 1000D, or another signal signature stored for a lock cable type. The logic device may associate the received signal to a stored signal signature using any algorithm or signal processing.

The logic device may be configured to generate a signal based on the type of the lock cable 612 inserted through the hole 638. For example, the logic device may generate a first signal based on detection of the first signal signature 1000A, a second signal based on detection of the second signal signature 1000B, and the like. The signal generated by the logic device may indicate use of a proprietary cable lock or docking station. For example, the signal may generate a "Sorry, this docking station is for Lyft vehicles only" or "Great! You found a Lyft docking station to end your ride," among other indicators.

Figure 11:
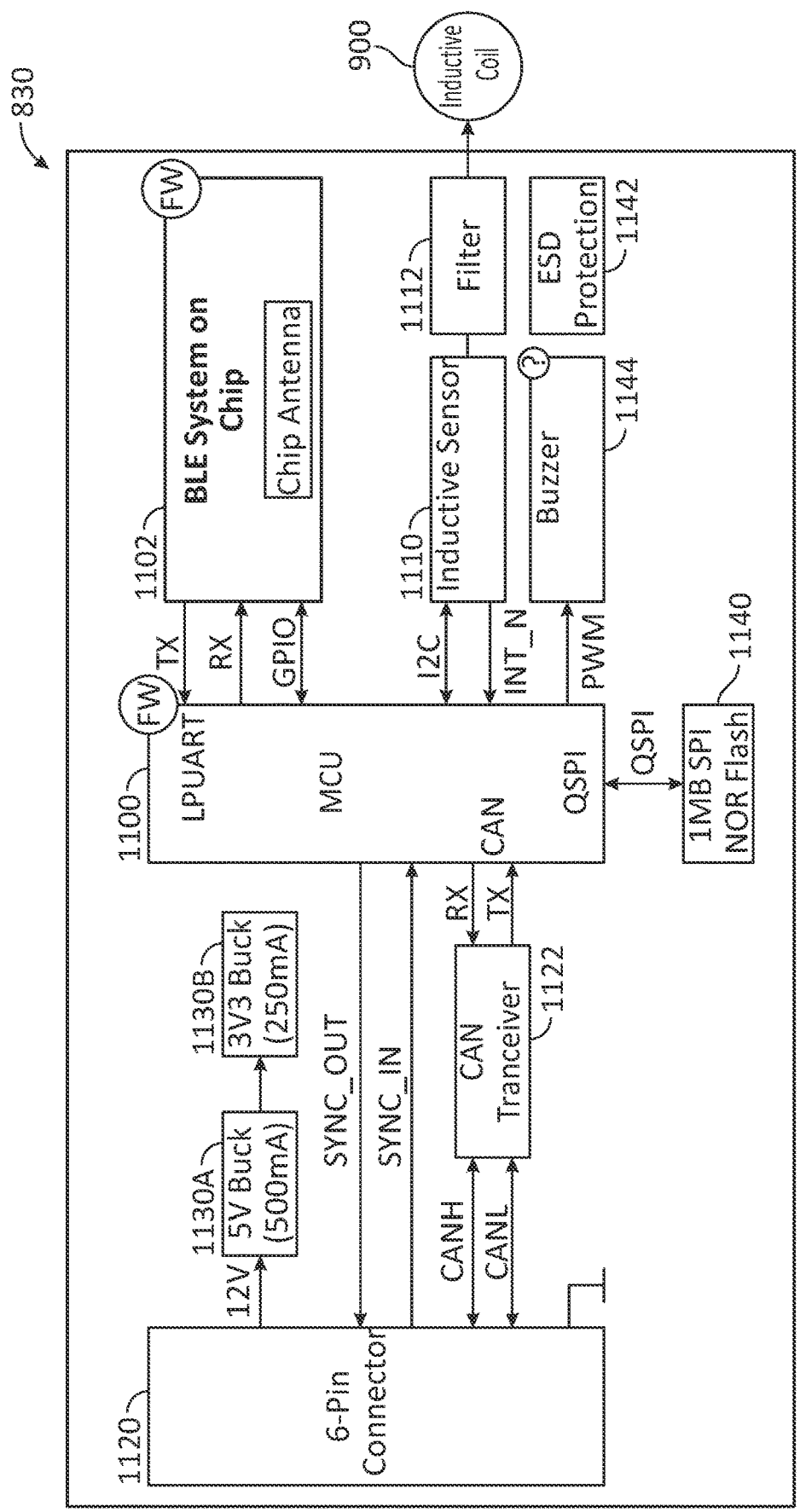
FIG. 11 illustrates an electrical block diagram of the dock module, in accordance with an embodiment of the disclosure.

FIG. 11 illustrates an electrical block diagram of the dock module 830, in accordance with an embodiment of the disclosure. Referring to FIG. 11, the dock module 830 may include a logic device 1100 (e.g., an MCU) electronically coupled to one or more modules, sensors, transceivers, or connectors. For example, the dock module 830 may include a BLE System-on-Chip (SoC) 1102 coupled to the logic device 1100 via one or more connections (e.g. a transmitting pin, a receiving pin, and a general-purpose input/output pin, or any combination thereof). The BLE SoC 1102 may be configured to communicate with one or more racks 626, one or more micromobility transit vehicles 602, the beacon 840, and/or an external device/network. For example, the BLE SoC 1102 may include one or more antennas or readers.

With continued reference to FIG. 11, the dock module 830 may include an inductive sensor 1110 coupled to the logic device 1100 (e.g., via a serial or other connection). The inductive coil assembly 900 may be coupled to the inductive sensor 1110. The inductive sensor 1110 may process the signals received from the inductive coil assembly 900, such as detecting a signal signature (e.g., signal signatures 1000) produced by the inductive coil assembly 900 when lock cable 612 is inserted and positioned at least partially within the inductive coil assembly 900. In embodiments, a signal filter 1112 may be positioned between the inductive coil assembly 900 and the inductive sensor 1110. The logic device 1100 may receive a signal (e.g., a current signal) from the inductive coil assembly 900 (e.g., via the inductive sensor 1110). The logic device 1100 may determine a characteristic of the signal, such as a change in current magnitude, a shape or signature of the current signal, or other characteristic.

The dock module 830 may include a connector 1120 (e.g., a 6-pin connector) configured to connect the dock module 830 to the docking station 600. The connector 1120 may be grounded and coupled to the logic device 1100 directly via one or more connections (e.g., SYNC OUT pin, SYNC-IN pin, etc.). In embodiments, the connector 1120 may be coupled to the logic device 1100 via a CAN transceiver 1122 positioned between the connector 1120 and the logic device 1100. As shown, one or more step-up/step-down voltage regulators may be connected to the connector 1120, such as a 5V buck regulator 1130A and/or a 3.3V buck regulator 1130B.

The dock module 830 may include other features. For example, the dock module 830 may include a memory 1140 coupled to the logic device 1100. The memory 1140 may be embodied as a serial peripheral interface (SPI) NOR flash memory, although other configurations are contemplated. In embodiments, the dock module 830 may include electrostatic discharge (ESD) protection 1142 to limit or prevent damage to the dock module 830 caused by ESD, lightning or other destructive voltage transients. In embodiments, the dock module 830 may include a buzzer 1144 coupled to the logic device 1100 to provide audible feedback to an operator or user as desired. Depending on the application, the buzzer may be controlled via pulse-width modulation (PWM).

Figure 12:
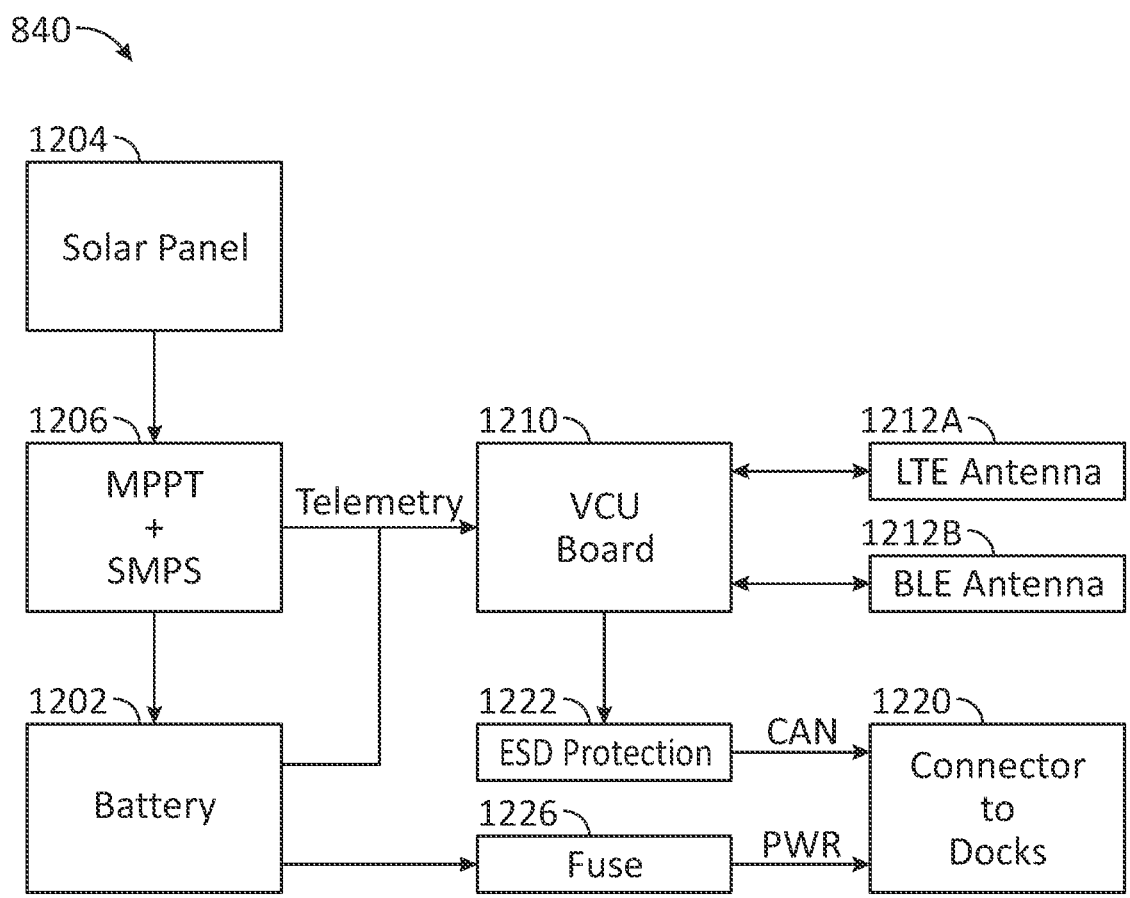
FIG. 12 illustrates an electrical block diagram of a beacon of a docking station, in accordance with an embodiment of the disclosure.

FIG. 12 illustrates an electrical block diagram of the beacon 840, in accordance with an embodiment of the disclosure. Referring to FIG. 12, the beacon 840 may include a power supply. Depending on the application, the power supply may include a battery 1202. The battery 1202 may be coupled to a solar panel 1204 via a power module 1206. The power module 1206 may include maximum power point tracking (MPPT) to facilitate power transfer from the solar panel 1204 to the battery 1202 at highest efficiency. For example, the power module 1206 may determine the point of highest power transfer efficiency for a detected condition (e.g., amount of sunlight, temperature of the solar panel 1204, electrical characteristics of the load, etc.) and maintain the load characteristics at the point. The power module 1206 may include a switched-mode power supply (SMPS) to provide a required output voltage and/or current characteristic. For example, the SMPS may incorporate a switching regulator to transfer power from a DC or AC source to DC loads, while converting voltage and current characteristics.

The beacon 840 may include a logic device 1210 (e.g., a VCU board) coupled to the battery 1202 and power module 1206. The logic device 1210 may receive telemetry data from the power module 1206 and electrical power from the battery 1202. The logic device 1210 may be coupled to one or more antennas or communication modules, such as an LTE antenna 1212A and a BLE antenna 1212B, to communicate with the racks 626, the micromobility transit vehicles 602 in the docking station 600, or an external device/network.

With continued reference to FIG. 12, the logic device 1210 may be coupled to a dock connector 1220 to provide and/or receive controller area network (CAN) data to or from the dock connector 1220. In embodiments, an ESD protection device 1222 may be placed between the logic device 1210 and the dock connector 1220 to safeguard the data interface against damage or latch-up caused by ESD, lightning and other destructive voltage transients. The battery 1202 may be coupled to the dock connector 1220 via a fuse 1226 to provide power to the dock connector 1220. The dock connector 1220 may be connected to one or more racks 626 of the docking station 600.

Figure 13:
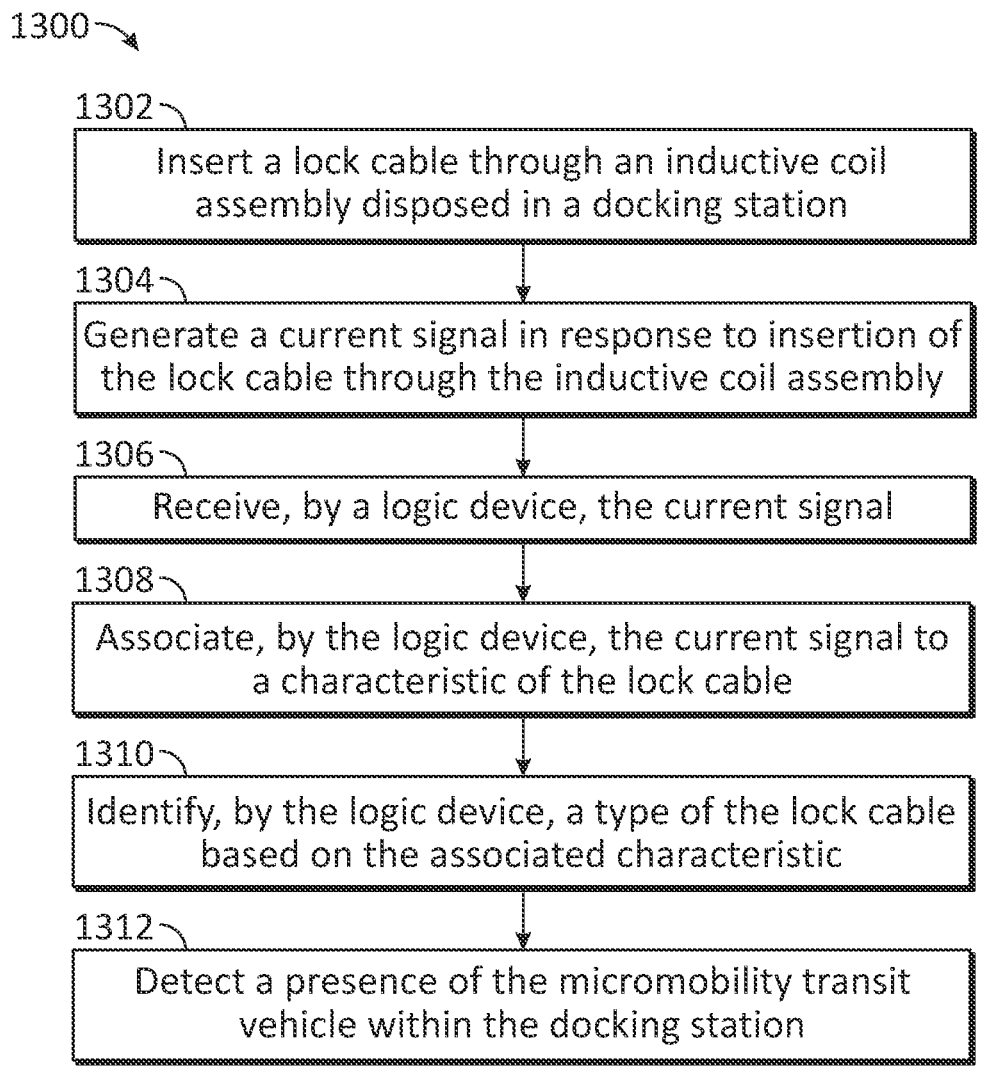
FIG. 13 illustrates a flow diagram of a process of detecting a lock characteristic of a micromobility transit vehicle secured to a docking station, in accordance with an embodiment of the disclosure.

FIG. 13 illustrates a flow diagram of a process 1300 of detecting a lock characteristic of a micromobility transit vehicle secured to a docking station, in accordance with an embodiment of the disclosure. The micromobility transit vehicle and docking station associated with process 1300 may be similar to micromobility transit vehicle 602 and docking station 600 described above. It should be appreciated that any step, sub-step, sub-process, or block of process 1300 may be performed in an order or arrangement different from the embodiments illustrated by FIG. 13. For example, one or more blocks may be omitted from or added to the process 1300. Although process 1300 is described with reference to the embodiments of FIGS. 1-10D, process 1300 may be applied to other embodiments.

In block 1302, process 1300 may include inserting a lock cable through an inductive coil assembly disposed in a docking station. For example, a user of a micromobility transit vehicle may insert a lock cable of the micromobility transit vehicle through a hole disposed in a bollard of the docking station to secure the micromobility transit vehicle to the docking station. The inductive coil assembly may be disposed around at least a portion of the hole, such that insertion of the lock cable through the hole inserts the lock cable through the inductive coil assembly. In embodiments, an insertion or presence of the lock cable within the hole may be detected.

In block 1304, process 1300 may include generating a current signal in response to insertion of the lock cable through the inductive coil assembly. The current signal may be generated by the inductive coil assembly. For example, current flowing through the inductive coil assembly may change with insertion of the lock cable through the inductive coil assembly. The current signal may be generated based on insertion of the lock cable within the hole disposed in the bollard of the docking station to secure the micromobility transit vehicle. The current signal may be different depending on one or more characteristics of the lock cable. For instance, different types or amounts of material in the lock cable may produce different responses in the current signal, as discussed herein. The current signal may be generated simultaneously or near-simultaneously with insertion of the lock cable through the inductive coil assembly. In embodiments, the current signal may be generated in response to insertion of the lock cable through the inductive coil assembly.

In block 1306, process 1300 may include receiving, by a logic device, the current signal. The logic device may be in wired or wireless communication with the inductive coil assembly to receive the current signal. Depending on the application, the inductive coil assembly may include the logic device, or the logic device may be a separate element (or part of a separate device) to which the inductive coil assembly is connected (either wired or wirelessly).

In block 1308, process 1300 may include associating, by the logic device, the current signal to a characteristic of the lock cable securing the micromobility transit vehicle to the docking station. For example, the logic device may associate a magnitude, shape or other characteristic of the current signal to a characteristic of the lock cable. The logic device may associate the current signal to a condition (new vs. damaged), state (locked vs. unlocked), or other characteristic (proprietary vs. non-proprietary) of the lock cable.

In block 1310, process 1300 may include identifying, by the logic device, a type of the lock cable based on the associated characteristic. Block 1310 may include associating one or more sensor signals with a signal signature stored for a lock cable type. Different lock cables, such as different types or amounts of material in the lock cable, may exhibit different responses in the current of the inductive coil assembly. The detected current signal may be compared against one or more signal signatures stored for known cable types. As a result, it can be detected whether a particular lock cable or cable type (e.g., a proprietary lock cable) has been secured to the docking station.

In block 1312, process 1300 may include detecting a presence of the micromobility transit vehicle within the docking station. For example, detection of a proprietary lock cable secured to the docking station may indicate the presence of an authorized micromobility transit vehicle within the docking station. In embodiments, a mat sensor (e.g., weight sensor, proximity sensor, etc.) may be provided at each dock or rack of the docking station to facilitate detection of a parked micromobility transit vehicle. Additional or alternative sensors, such as Bluetooth low energy communications, RFID readers, NFC readers, and/or others to facilitate identification and/or communication with the micromobility transit vehicle within the docking station.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

All relative and directional references (including upper, lower, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

One or more features or functions described herein may be included or omitted, or enabled or disabled on an opt-in basis, particularly for optimizing rider safety, comfort, and reliability. For example, a rider may choose to turn on or turn off, or use or not use, one or more of the features or functions described herein for their personal safety and comfort. In some instances, these features or functions may be turned on temporarily and/or turned on automatically to maximize rider safety and comfort, among various other possibilities.

The present disclosure teaches by way of example and not by limitation. Therefore, the matter contained in the above description or shown in the accompanying drawings should be interpreted as illustrative and not in a limiting sense. It should also be understood that numerous modifications and variations are possible in accordance with the principles of the present disclosure. The following claims are intended to cover all generic and specific features described herein, as well as all statements of the scope of the present method and system, which, as a matter of language, might be said to fall there between.

What is claimed is:

1. A multimodal transportation system comprising:
    a micromobility transit vehicle comprising a lock cable; and
    a docking station adapted to secure the micromobility transit vehicle and comprising:
        a bollard comprising a hole disposed therein, wherein the lock cable is inserted through the hole to wrap the lock cable around a portion of the bollard and lock the micromobility transit vehicle to the docking station; and
        a dock module comprising an inductive coil assembly, wherein the dock module is configured to detect a characteristic of the lock cable based on one or more signals received from the inductive coil assembly, the one or more signals being affected by a type, a structure, or an amount of material in the lock cable.

2. The multimodal transportation system of claim 1, wherein the inductive coil assembly is disposed around the hole, and wherein the inductive coil assembly is configured to generate a current signal in response to insertion of the lock cable through the hole.

3. The multimodal transportation system of claim 1, wherein the inductive coil assembly is configured to detect a presence of a lock configured to receive a pin of the lock cable through the hole.

4. The multimodal transportation system of claim 2, further comprising a logic device configured to identify a type of the lock cable inserted through the hole and generate a signal based on the type of the lock cable inserted through the hole.

5. The multimodal transportation system of claim 4, wherein the logic device is configured to associate one or more signals received from the inductive coil assembly with a signal signature stored for a lock cable type to identify the type of the lock cable inserted through the hole.

6. The multimodal transportation system of claim 1, wherein the docking station comprises a sensor configured to:
   detect a presence of a vehicle parked on a mat of the docking station; and
   detect an unwarranted removal of the vehicle from the mat for determining a tampering condition of the vehicle.

7. The multimodal transportation system of claim 1, further comprising a communications module to facilitate identification of the micromobility transit vehicle and one or more data transfers between the micromobility transit vehicle and the docking station.

8. The multimodal transportation system of claim 7, wherein the communications module comprises at least one of a Bluetooth low energy module, a radio-frequency identification reader, or a near-field communications reader.

9. The multimodal transportation system of claim 1, further comprising a network module to facilitate communications between the docking station and a network.

10. A docking station comprising:
    a rack configured to dock a micromobility transit vehicle;
    a bollard comprising a hole disposed therein, wherein a lock cable is inserted through the hole to wrap the lock cable around a portion of the bollard and lock the micromobility transit vehicle to the docking station within the rack; and
    a dock module comprising an inductive coil assembly, wherein the dock module is configured to detect a characteristic of a lock cable based on one or more signals received from the inductive coil assembly, the one or more signals being affected by a type, a structure, or an amount of material in the lock cable.

11. The docking station of claim 10, wherein the bollard comprises:
    a stanchion; and
    an anchor connected to the stanchion and including a hole disposed therein to receive the lock cable,
    wherein the dock module is configured to generate a current signal in response to insertion of the lock cable through the hole.

12. The docking station of claim 10, wherein the dock module is configured to detect a characteristic of the lock cable positioned within a hole disposed in the bollard.

13. The docking station of claim 10, further comprising a sensor configured to:
    detect a presence of the micromobility transit vehicle positioned on a base of the rack; and
    detect an unwarranted removal of the micromobility transit vehicle from the base for determining a tampering condition of the vehicle.

14. The docking station of claim 10, further comprising a beacon having a communications module to facilitate identification of the micromobility transit vehicle and one or more data transfers between the micromobility transit vehicle and the docking station.

15. The docking station of claim 10, further comprising a plurality of racks connected together, each rack of the plurality of racks comprising a respective bollard and dock module.

16. A multimodal transportation system comprising:
    one or more docking stations according to claim 10; and
    the micromobility transit vehicle having the lock cable.

17. A method of detecting a lock characteristic of a micromobility transit vehicle secured to a docking station, the method comprising:
    generating a current signal in response to insertion of a lock cable through an inductive coil assembly disposed in the docking station, the current signal being affected by a type, a structure, or an amount of material in the lock cable;
    associating the current signal to a characteristic of the lock cable; and
    identifying a type of the lock cable based on the associated characteristic.

18. The method of claim 17, wherein generating the current signal comprises generating the current signal based on insertion of the lock cable within a hole disposed in a bollard of the docking station to secure the micromobility transit vehicle.

19. The method of claim 17, wherein identifying the type of the lock cable comprises associating one or more sensor signals with a signal signature stored for a lock cable type.

20. The method of claim 17, further comprising detecting a presence of the micromobility transit vehicle within the docking station.

* * * * *